(12) United States Patent
Ogane

(10) Patent No.: US 11,834,207 B2
(45) Date of Patent: Dec. 5, 2023

(54) FISHING SYSTEM

(71) Applicant: ACTUAL TOKYO INC., Tokyo (JP)

(72) Inventor: Toshio Ogane, Tokyo (JP)

(73) Assignee: ACTUAL TOKYO INC., Tokyo (JP)

( * ) Notice: Subject to any disclaimer, the term of this patent is extended or adjusted under 35 U.S.C. 154(b) by 0 days.

(21) Appl. No.: 18/319,741

(22) Filed: May 18, 2023

(65) Prior Publication Data
US 2023/0286680 A1 Sep. 14, 2023

Related U.S. Application Data

(63) Continuation of application No. PCT/JP2021/038086, filed on Oct. 14, 2021.

(30) Foreign Application Priority Data

Nov. 19, 2020 (JP) .................................. 2020-192728

(51) Int. Cl.
B64U 20/87 (2023.01)
B64U 101/05 (2023.01)

(52) U.S. Cl.
CPC .......... *B64U 20/87* (2023.01); *B64U 2101/05* (2023.01); *B64U 2201/20* (2023.01)

(58) Field of Classification Search
CPC ........................ B64U 2101/20; B64U 2101/30
See application file for complete search history.

(56) References Cited

U.S. PATENT DOCUMENTS

| | | | |
|---|---|---|---|
| 2016/0200437 A1* | 7/2016 | Ryan ..................... | B64C 39/022 244/99.2 |
| 2018/0077918 A1* | 3/2018 | Yu .......................... | B64C 39/024 |
| 2018/0107210 A1* | 4/2018 | Harnett ................... | G01S 15/96 |
| 2018/0370631 A1* | 12/2018 | Gan ........................ | A01K 83/00 |

(Continued)

FOREIGN PATENT DOCUMENTS

| | | |
|---|---|---|
| AU | 2017100932 A4 | 8/2017 |
| AU | 2017100933 A4 | 8/2017 |

(Continued)

OTHER PUBLICATIONS

"Fishing with a drone—Even beginners can easily catch fish with a sonar function (?) Aguadrone". Jun. 4, 2015. URL: https://ennori.jp/3181/aguadrone-drone-with-sonar-fish-finder. Cited in Specification. English machine translation provided.

(Continued)

*Primary Examiner* — Christopher P Ellis
(74) *Attorney, Agent, or Firm* — ROSSI, KIMMS & McDOWELL LLP

(57) ABSTRACT

A fishing system includes an unmanned aerial vehicle and a fishing line fixing portion placed on a main body of the unmanned aerial vehicle, the fishing line fixing portion including a first fixing portion for fixing a fishing line and a second fixing portion detachably connected to the first fixing portion. The unmanned aerial vehicle includes an imaging device, a fish school tracking processing unit configured to identify a fish in imaging data captured by the imaging device and control the unmanned aerial vehicle to track the fish. A connection between the first fixing portion and the second fixing portion is released when the fish is hooked on an artificial bait attached to a first end of the fishing line.

9 Claims, 12 Drawing Sheets

(56) References Cited

U.S. PATENT DOCUMENTS

| | | | |
|---|---|---|---|
| 2020/0010193 A1* | 1/2020 | Alexander | B64C 39/024 |
| 2020/0107530 A1 | 4/2020 | Ikebukuro | |
| 2023/0027071 A1* | 1/2023 | Shmueli | G06Q 50/02 |
| 2023/0046127 A1* | 2/2023 | Guerra Johansson | H04N 7/183 |
| 2023/0174234 A1* | 6/2023 | Eaton | G05D 1/12 |
| | | | 701/2 |

FOREIGN PATENT DOCUMENTS

| | | | |
|---|---|---|---|
| AU | 2017100936 A4 | 8/2017 | |
| CN | 205946963 U * | 2/2017 | |
| CN | 206528632 U * | 9/2017 | |
| JP | H0445733 A | 2/1992 | |
| JP | 3212937 U | 10/2017 | |
| JP | 3212938 U | 10/2017 | |
| JP | 3213395 U | 11/2017 | |
| JP | 2017209026 A | 11/2017 | |
| JP | 2018011567 A | 1/2018 | |
| JP | 2019176771 A | 10/2019 | |
| JP | 2020058250 A | 4/2020 | |
| WO | WO-2017123768 A1 * | 7/2017 | A01K 79/00 |
| WO | 2018084717 A2 | 5/2018 | |
| WO | WO-2018182944 A1 * | 10/2018 | A01M 1/02 |
| WO | WO-2021041629 A1 * | 3/2021 | A01K 29/005 |
| WO | WO-2023034651 A2 * | 3/2023 | A01K 99/00 |

OTHER PUBLICATIONS

"You can catch this! Groundbreaking tuna fishing by carrying bait with a drone". May 6, 2016. URL: https://karapaia.com/archives/52217103.html. Cited in Specification, NPL3, NPL4, NPL5 and NPL6. English machine translation provided.

International Search Report issued in Intl. Appln. No. PCT/JP2021/038086, dated Dec. 21, 2021. English translation provided.

Written Opinion issued in Intl. Appln. No. PCT/JP2021/038086, dated Dec. 21, 2021. English translation provided.

Office Action issued in Japanese Appln. No. 2020-192728, dated Dec. 22, 2020. English machine translation provided.

Decision to Grant a Patent issued in Japanese Appln. No. 2020-192728, dated Feb. 2, 2021. English machine translation provided.

* cited by examiner

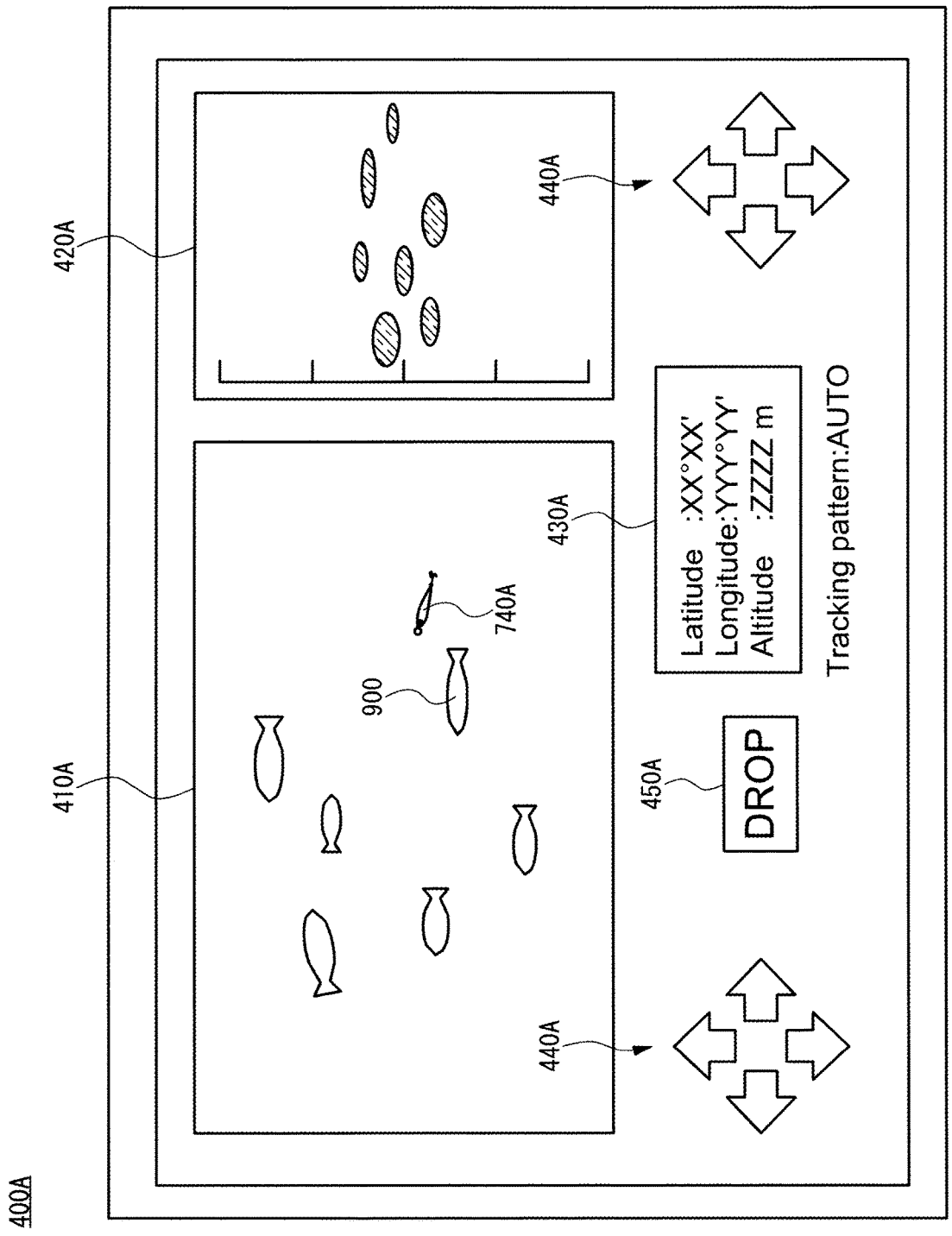

FISHING SYSTEM

CROSS-REFERENCE TO RELATED APPLICATIONS

This application is a Continuation of International Patent Application No. PCT/JP2021/038086, filed on Oct. 14, 2021, which claims the benefit of priority to Japanese Patent Application No. 2020-192728, filed on Nov. 19, 2020, the entire contents of which are incorporated herein by reference.

FIELD

An embodiment of the present invention relates to a fishing system using an unmanned aerial vehicle.

BACKGROUND

Pole cast fishing by a person is limited in the range from which bait or artificial bait attached to a fishing line or a fishing hook can be dropped. Therefore, a boat is needed to fish offshore, away from land.

On the other hand, an unmanned aerial vehicle (a drone) is attracting attention as a means of transporting the bait or the artificial bait to distant areas that cannot be reached by pole cast fishing with a fishing rod. Since the unmanned aerial vehicle can be equipped with a camera, it is possible not only to carry the bait or the artificial bait but also to determine where to drop the bait or the artificial bait while capturing the shadow of fish with the camera (See, for example, Non-Patent Literature 1 (Fishing with Drone—Is it easy for beginners to catch fish with a sonar function (?), "Aguadrone", [online], Jun. 4, 2015, Internet <URL: https://ennori.jp/3181/aguadrone-drone-with-sonar-fish-finder>) and Non-Patent Literature 2 ("You can catch tuna with this manner! Pole-and-line fishing of tuna by carrying bait with a drone is groundbreaking.", [online], May 6, 2016, Internet <URL: https://ennori.jp/3181/auadrone-drone-with-sonar-fish-finder>)).

SUMMARY

A fishing system according to an embodiment of the present invention includes an unmanned aerial vehicle and a fishing line fixing portion placed on a main body of the unmanned aerial vehicle, the fishing line fixing portion including a first fixing portion for fixing a fishing line and a second fixing portion detachably connected to the first fixing portion. The unmanned aerial vehicle includes an imaging device, a fish school tracking processing unit configured to identify a fish in imaging data captured by the imaging device and control the unmanned aerial vehicle to track the fish. A connection between the first fixing portion and the second fixing portion is released when the fish is hooked on an artificial bait attached to a first end of the fishing line.

A fishing system according to an embodiment of the present invention includes an unmanned aerial vehicle and a fishing line fixing portion detachably fixed to a main body and fixing a fishing line. The unmanned aerial vehicle includes an imaging device, a connection control unit configured to release a fixing between the main body and the fishing line fixing portion, a fish school tracking processing unit configured to identify a fish in imaging data captured by the imaging device and control the unmanned aerial vehicle to track the fish, and a hooking determination processing unit configured to determine whether the fish is hooked on an artificial bait attached to a first end of the fishing line.

The fishing line fixing portion includes a first fixing portion and a second fixing portion, and a fixing between the main body and the first fixing portion and a fixing between the main body and the second fixing portion may be independently released. The artificial bait may be dropped into the sea together with the first fixing portion when the fixing between the main body and the first fixing portion is released. The fixing between the main body and the second fixing portion may be released and the second fixing portion may be dropped into the sea when the fish is hooked.

A fishing system according to an embodiment of the present invention includes an unmanned aerial vehicle and a fishing line fixing portion fixed to a main body of the unmanned aerial vehicle and fixing a fishing line. The unmanned aerial vehicle includes an imaging device, a connection control unit configured to release a fixing of the fishing line by the fishing line fixing portion, a fish school tracking processing unit configured to identify a fish in imaging data captured by the imaging device and control the unmanned aerial vehicle to track the fish, and a hooking determination processing unit configured to determine whether the fish is hooked on an artificial bait attached to a first end of the fishing line.

The fishing line fixing portion includes a first fixing portion and a second portion, and a fixing of the fishing line by the first fixing portion and a fixing of the fishing line by the second fixing portion may be independently released. The artificial bait may be dropped into the sea when the fixing of the fishing line by the first fixing portion is released. The fixing of the fishing line by the second fixing portion may be released when the fish is hooked.

The hooking determination processing unit may make determinations based on information from a group of sensors provided on the unmanned aerial vehicle.

The hooking determination processing unit may make determinations by identifying a position of the fish in imaging data captured by the imaging device.

In a fishing system according to an embodiment of the present invention, after artificial bait is dropped into the sea from an unmanned aerial vehicle, it is possible to quickly determine that a fish is hooked by tracking a fish or a school of fish, and to separate a fishing line from the unmanned aerial vehicle. As a result, it is possible to prevent the unmanned aerial vehicle from being pulled into the sea when the fish is hooked.

BRIEF DESCRIPTION OF DRAWINGS

FIG. 12 is a schematic diagram illustrating a screen of an information communication terminal of a fishing system according to an embodiment of the present invention.

DESCRIPTION OF EMBODIMENTS

According to Non-Patent Literature 1, not only a camera function but also a sonar function is equipped to detect the shadow of fish in the sea, and the artificial bait can be dropped from the unmanned aerial vehicle to the location where the shadow of fish is detected. Further, the unmanned aerial vehicle can be equipped with a fishing function. However, when a large fish is hooked, the unmanned aerial vehicle may be pulled into the sea by the pulling force of the fish. In Non-Patent Literature 2, although a large tuna is caught using the unmanned aerial vehicle, the unmanned aerial vehicle is limited to confirming the location of a school of fish and transporting the bait. In other words, both Non-Patent Literature 1 and Non-Patent Literature 2 have the problem that the unmanned aerial vehicle is pulled into the sea when the fish is hooked.

In view of the above problem, one object of an embodiment of the present invention is to provide a fishing system that prevents an unmanned aerial vehicle from being pulled into the sea when a fish is hooked.

Hereinafter, embodiments of the present invention are described in detail. However, the present invention can be implemented in various modes without departing from the gist of the invention and should not be interpreted as being limited to the description of the embodiments exemplified below.

In the specification, the term "unmanned aerial vehicle" means an unmanned aerial vehicle can fly by remote or automatic control. In addition, an "unmanned aerial vehicle" may be referred to as a drone.

In the specification, the term "image" means a still image and a moving image.

In the specification, the term "fish school" or "group of fish" means a group of one or more fish.

In the specification, the term "information communication terminal" means an information device that can access information via a network.

Although an "information communication terminal" is, for example, a mobile phone, a smart phone, a tablet, a personal computer, or the like, the "information communication terminal" is not limited to those devices.

First Embodiment

A fishing system 10 according to an embodiment of the present invention is described with reference to FIGS. 1 to 8.

[1. Configuration of Fishing System 10]

Figure 1:
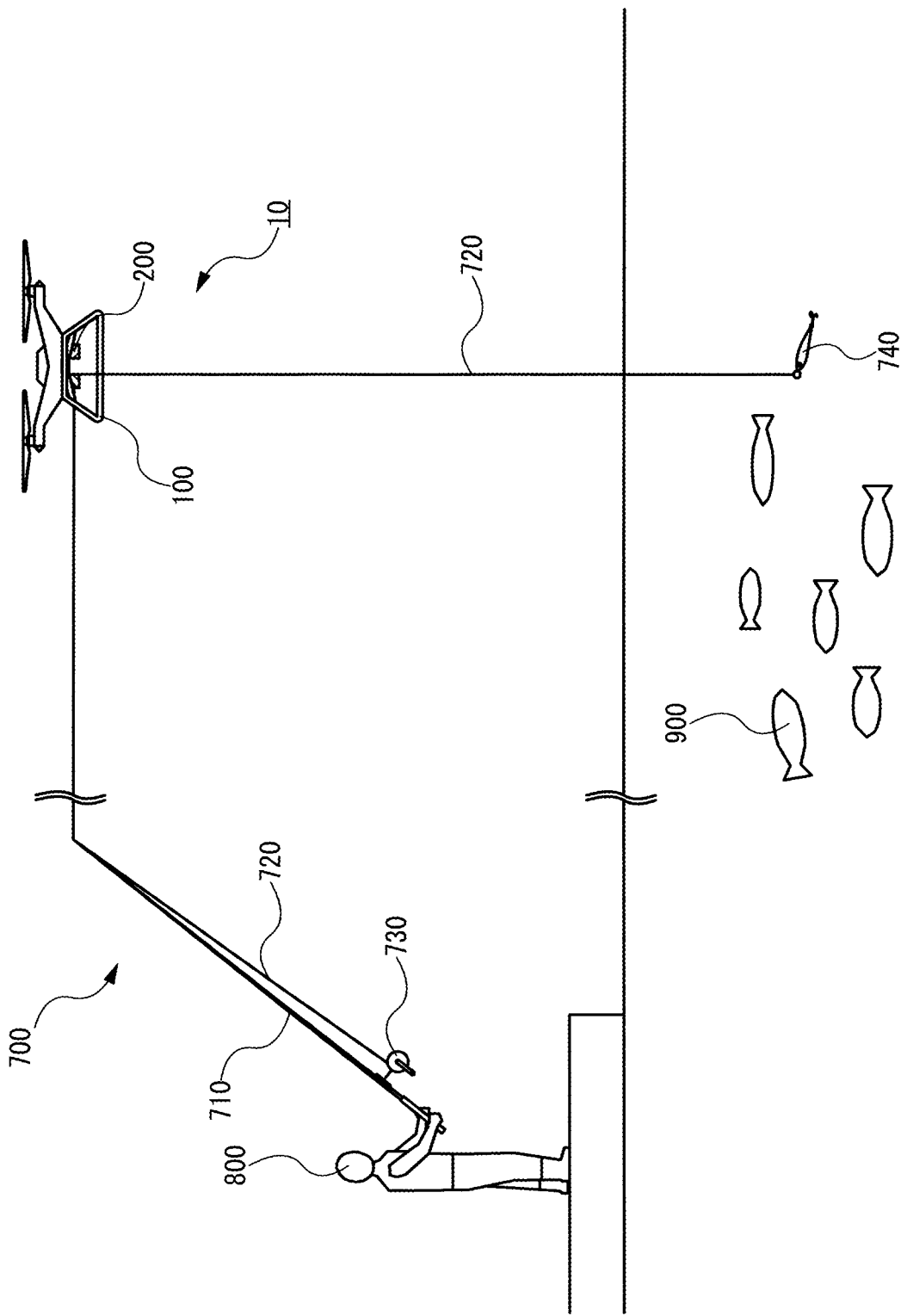
FIG. 1 is a schematic diagram illustrating the use of a fishing system according to an embodiment of the present invention.

FIG. 1 is a schematic diagram illustrating the use of the fishing system 10 according to an embodiment of the present invention. The fishing system 10 includes an unmanned aerial vehicle 100 and a fishing line fixing portion 200, and the fishing system 10 is used by being placed on fishing tackle 700. Although the fishing line fixing portion 200 is preferably provided below the unmanned aerial vehicle 100, it is not limited to this configuration.

A typical fishing tackle 700 may be used in the fishing system 10. The fishing tackle 700 as shown in FIG. 1 includes a fishing rod 710, a fishing line 720, a reel 730, and artificial bait 740. The artificial bait 740 is attached to one end (hereinafter, referred to as "first end") of the fishing line 720. Further, the reel 730 is connected to the other end (hereinafter, referred to as "second end".) of the fishing line 720, and the fishing line 720 is reeled onto the reel 730.

The steps of fishing using the fishing system 10 can be broadly classified into a step of detecting a school of fish, a step of dropping artificial bait, a step of tracking a school of fish, a hooking determination step, a step of separating the fishing line from the unmanned aerial vehicle, and a step of recovering the unmanned aerial vehicle. However, the use of the fishing system 10 is not limited to these steps. In the fishing system 10, other steps may be included, and some of the steps in the above description may not be performed.

When catching a fish 900 using the fishing system 10, in the beginning, a user 800 fixes the fishing line 720 to which the artificial bait 740 is attached to the fishing line fixing portion 200. In this state, since the fishing line 720 is connected to the unmanned aerial vehicle 100, the unmanned aerial vehicle 100 can fly carrying the fishing line 720 over the sea. The unmanned aerial vehicle 100 may be piloted by the user 800 or may be controlled by autopilot. The unmanned aerial vehicle 100 of the fishing system 10 can detect a school of fish after flying to a destination or while flying (the step of detecting a school of fish). Then, when the school of fish is detected, the artificial bait 740 can be dropped at the location where the school of fish is detected (the step of dropping artificial bait).

When catching a fish using the fishing system 10, the fishing line 720 is fixed to the fishing line fixing portion 200 even after the artificial bait 720 is dropped. Therefore, the unmanned aerial vehicle 100 can track the school of fish by controlling the flight of the unmanned aerial vehicle 100 (the step of tracking a school of fish). Although the details of a connection configuration between the unmanned aerial vehicle 100 and the fishing line fixing portion 200 are described later, when the fish 900 in the school of fish is hooked (hereinafter, described as the fish 900 bites the artificial bait 740), the fishing line 720 is separated from the unmanned aerial vehicle 100 (the step of separating a fishing line from an unmanned aerial vehicle). Therefore, even when the fish 900 is large, the unmanned aerial vehicle 100 is not pulled into the sea. The fishing system 10 can determine whether the fish 900 is hooked on the artificial bait 740 (the hooking determination step). Then, the user 800 reels the reel 730 to catch the fish 900 and recover the unmanned vehicle 100 (the step of recovering an unmanned aerial vehicle).

Also, although FIG. 1 shows an aspect in which the user 800 catches a fish using the fishing system 10 on land, the fishing system 10 can be used anywhere, such as when the user 800 is on a boat.

Figure 2A:
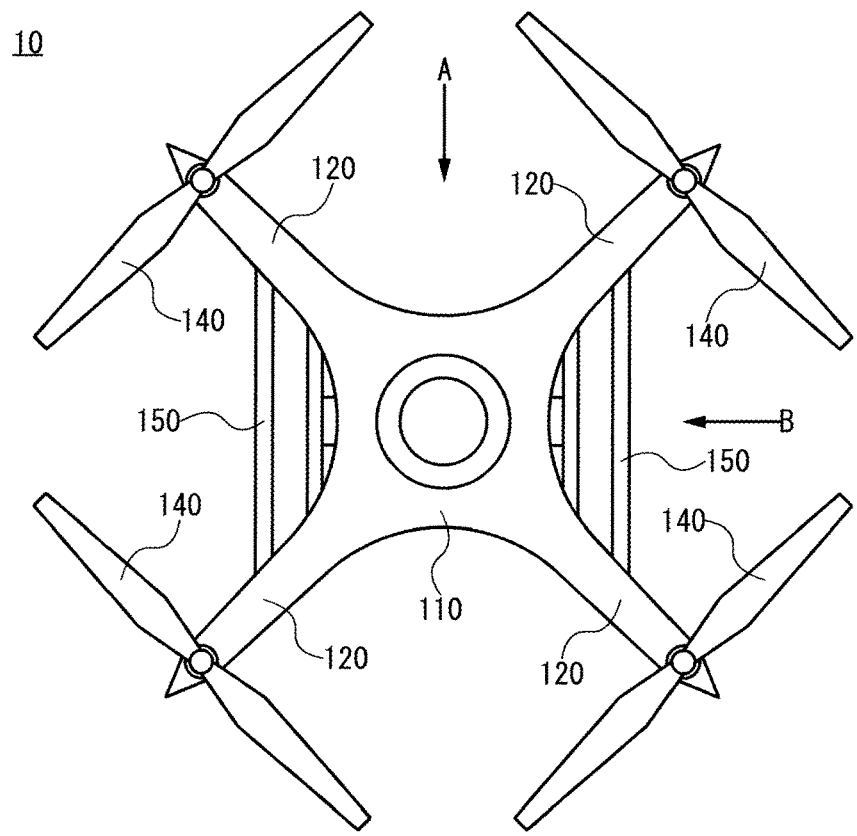
FIG. 2A is a schematic diagram illustrating a configuration of a fishing system according to an embodiment of the present invention.
Figure 2B:
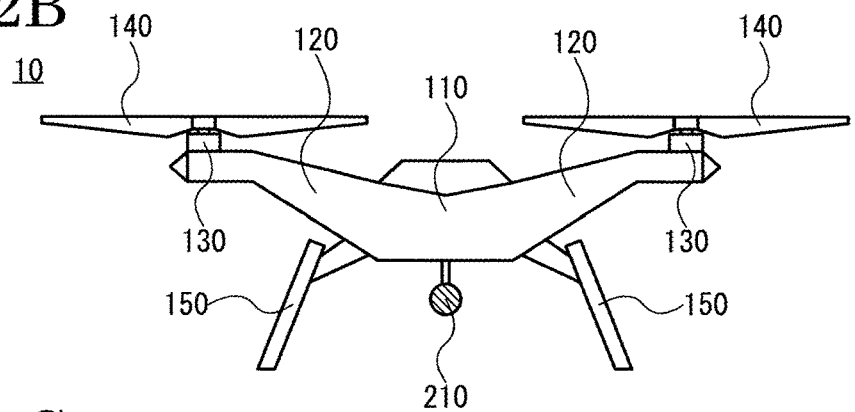
FIG. 2B is a schematic diagram illustrating a configuration of a fishing system according to an embodiment of the present invention.
Figure 2C:
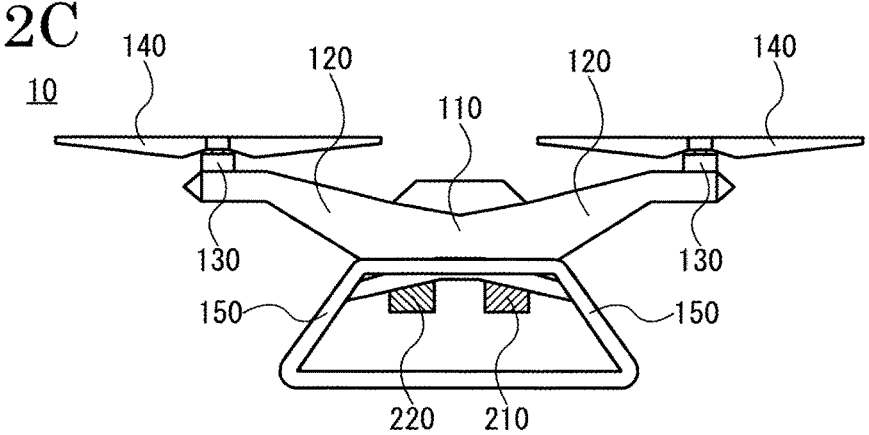
FIG. 2C is a schematic diagram illustrating a configuration of a fishing system according to an embodiment of the present invention.

Each of FIGS. 2A to 2C is a schematic diagram illustrating a configuration of the fishing system 10 according to an embodiment of the present invention. Specifically, FIG. 2A shows a plan view of the unmanned aerial vehicle 100 seen from the upper direction, FIG. 2B shows a front view of the unmanned aerial vehicle 100 seen from the A direction which is shown in FIG. 2A, and FIG. 2C shows a side view of the unmanned aerial vehicle 100 seen from the B direction which is shown in FIG. 2A.

The unmanned aerial vehicle 100 includes a main body 110, arms 120, rotors 130, blades 140, and skids 150. In the unmanned aerial vehicle 100, four arms 120 extend from diagonal positions of the main body 110. Further, the rotor 130 and the blade 140 is provided on an end of each of the arms 120. The blade 140 is rotatably supported by the rotor 130. The skids 150 are provided below the main body 110.

The main body 110 may support the arms 120 and may fix the fishing line fixing portion 200. Further, the main body 110 is equipped with components necessary for controlling the fishing system 10 (including controlling the unmanned aerial vehicle 100.). Also, an internal configuration of the main body 110 is described later.

The arm 120 can support the rotor 130 and the blade 140. The arms 120 may be formed integrally with the main body 110.

The rotor 130 can rotate the blade 140. For example, a brushless motor can be used for the rotor 130.

The blade 140 can generate lift by rotating. That is, the unmanned aerial vehicle 100 can fly with the lift generated by rotation of the four blades 140. The unmanned aerial vehicle 100 can ascend, descend, move forward, move backward, turn left, turn right, or hover by combining the number of rotations or the direction of rotation of the four blades 140.

The skids 150 can stabilize the position of the unmanned aerial vehicle 100 when the unmanned aerial vehicle 100 takes off or lands, and can protect a lower portion of the main body 110. An imaging device or a group of sensors, which is described later, is often attached to the lower portion of the main body 110, and the imaging device or the group of sensors can be protected by the skids 150. The skids 150 may be folded below the main body 110 or may be detached from the main body 110 when the unmanned aerial vehicle 100 is not in use.

The configuration of the unmanned aerial vehicle 100 shown in FIGS. 2A to 2C is an example, and the unmanned aerial vehicle 100 is not limited to this configuration.

The fishing line fixing portion 200 includes a first fixing portion 210 and a second fixing portion 220. The first fixing portion 210 and the second fixing portion 220 are provided below the main body 110 of the unmanned aerial vehicle 100. Further, the first fixing portion 210 is located closer to the front side of the unmanned aerial vehicle 100 than the second fixing portion 220. Also, configurations of the first fixing portion 210 and the second fixing portion 220 are described later along with an aspect of their use.

Figure 3:
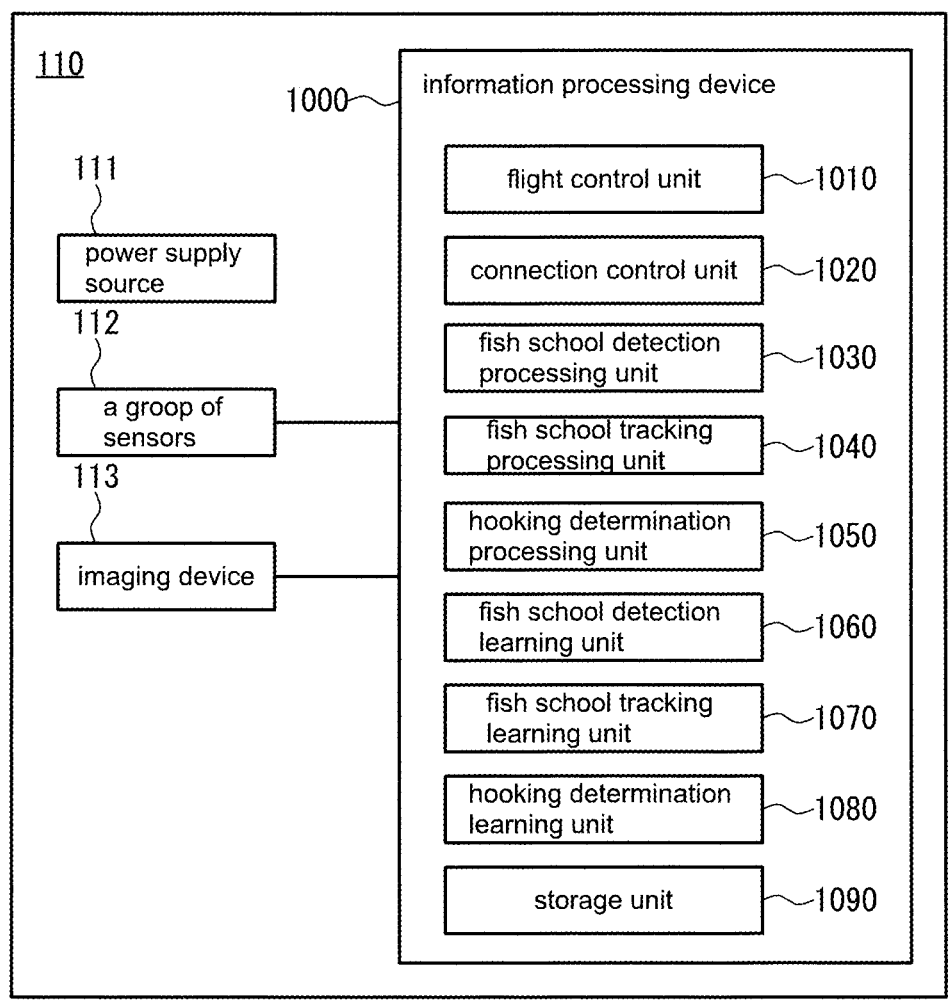
FIG. 3 is a block diagram illustrating an internal configuration of a main body of an unmanned aerial vehicle of a fishing system according to an embodiment of the present invention.

FIG. 3 is a block diagram illustrating an internal configuration of the main body 110 of the unmanned aerial vehicle of the fishing system 10 according to an embodiment of the present invention. The main body 110 includes a power supply source 111, a group of sensors 112, an imaging device 113, and an information processing device 1000. The information processing device 1000 may be electrically connected to the group of sensors 112 and the imaging device 113, or may be connected via an electrical communication. When the information processing device 1000 is connected via the electrical communication, each of the group of sensors 112, the imaging device 112, and the information processing device 1000 includes a communication unit.

The power supply source 111 may supply power to the rotor 130. Further, the power supply source 111 can supply power to the group of sensors 112, the imaging device 113, and the information processing device 1000. For example, a lithium ion battery or the like can be used for the power supply source 111. However, the power supply source 111 is not limited to this configuration. For example, the power supply source 111 may also generate power by burning fuel, such as gasoline, by an engine.

The group of sensors 112 can detect information necessary for various processes and various controls in the fishing system 10. The group of sensors 112 preferably includes a plurality of sensors. For example, a positioning sensor, a geomagnetic sensor, an acceleration sensor, a gyro sensor, a barometric pressure sensor, an ultrasonic sensor, a sonar sensor, or a fish finder or the like for can be used as the sensors included in the group of sensors 112. Some or all of these sensors may be located outside of the main body 110 of the unmanned aerial vehicle 100. Further, some or all of these sensors may be placed in the artificial bait 740.

The positioning sensor can detect position information of the unmanned aerial vehicle 100. That is, the positioning sensor is typically a Global Positioning System (GPS), and can detect latitude, longitude, or altitude position information of the unmanned aerial vehicle 100.

The geomagnetic sensor can detect orientation information of the unmanned aerial vehicle 100. Therefore, the direction in which the unmanned aerial vehicle 100 is facing can be identified by the geomagnetic sensor.

The acceleration sensor can measure the amount of change in velocity of the unmanned aerial vehicle 100. Therefore, vibration information or tilt information of the unmanned aerial vehicle 100 can be detected by the acceleration sensor.

The gyro sensor can measure a change in velocity and a change in angular velocity of the unmanned aerial vehicle 100. Therefore, the gyro sensor can detect tilt information and tilt angle information when the unmanned aerial vehicle 100 tilts.

The barometric pressure sensor may measure a barometric pressure at which the unmanned aerial vehicle 100 is located. Therefore, altitude information of the unmanned aerial vehicle 100 can be detected by the barometric pressure sensor. Further, the barometric pressure sensor can measure the wind pressure that the unmanned aerial vehicle 100 receives from the front. Velocity information of unmanned aerial vehicle 100 can be detected based on the pressure.

The ultrasonic sensor can receive reflected waves of ultrasonic waves emitted in the air and measure the distance to the sea. Therefore, altitude information of the unmanned aerial vehicle 100 can be detected by the ultrasonic sensor. Further, the ultrasonic sensor can measure distances to obstacles.

The sonar sensor receives reflected waves of ultrasonic waves in the sea, and can detect information about a school of fish in the direction and depth direction of the sea.

The fish finder can receive a reflected wave of an ultrasonic wave emitted from a transducer and detect information about a school of fish in the depth direction of the sea.

The sensors included in the group of sensors 112 are not limited to the sensors described above. For example, the group of sensors 112 may include a temperature sensor that measures air or water temperature, or a humidity sensor that measures humidity.

The imaging device 113 can capture an image of the surroundings of the unmanned aerial vehicle 100 and obtain imaging data. For example, the imaging device 113 is one or more cameras. It is preferable that the imaging device 113 can capture an image in front of or below the unmanned aerial vehicle 100. Further, it is preferable that the imaging device 113 that captures an image below the unmanned aerial vehicle 100 is provided with a polarizing filter. The polarizing filter provided on the imaging device 113 suppresses the reflection of light on the sea surface, making it easier to detect a school of fish in the sea. The imaging data obtained by the imaging device 113 can be used for various controls and various processes in the fishing system 10.

The information processing device 1000 includes a flight control unit 1010, a connection control unit 1020, a fish school detection processing unit 1030, a fish school tracking processing unit 1040, a hooking determination processing unit 1050, a fish school detection learning unit 1060, a fish school tracking learning unit 1070, a hooking determination learning unit 1080, and a storage unit 1090.

The information processing device 1000 is, for example, a computer, and includes a MPU (Micro Processing Unit), a CPU (Central Processing Unit), a ROM (Read Only Memory), a RAM (Random Access Memory), an HDD (Hard Disk Drive), a SSD (Solid State Drive), a DRAM (Dynamic Random Access Memory), a NAND flash memory, or a NOR flash memory. The various controls or the various processes in the flight control unit 1010, the connection control unit 1020, the fish school detection processing unit 1030, the fish school tracking processing unit 1040, the hooking determination processing unit 1050, the fish school detection learning unit 1060, the fish school tracking learning unit 1070, or the hooking determination learning unit 1080 can be executed by one or more computers reading a predetermined program.

The flight control unit 1010 can control the flight of the unmanned aerial vehicle 100. That is, the flight control unit 1010 can control the unmanned aerial vehicle 100 to take off and land based on the various information from the group of sensors 112, and to maintain a stable attitude during the flight. Further, the flight control unit 1010 can control the unmanned aerial vehicle 100 based on the fish school detection information, the fish school tracking information, and hooking determination information, which are described later.

The connection control unit 1020 can control the connection of the fishing line fixing portion 200. That is, the connection control unit 1020 can release the connection between the unmanned aerial vehicle 100 and the fishing line fixing portion 200 (the first fixing portion 210 or the second fixing portion 220), and can drop the fishing line fixing portion 200 (the first fixing portion 210 or the second fixing portion 220) from the unmanned aerial vehicle 100.

The fish school detection processing unit 1030 executes a fish school detection process. Specifically, it is possible to identify a school of fish from the imaging data of the image below the unmanned aerial vehicle 100 captured by the imaging device 113 (hereinafter referred to as "sea imaging data") and generate fish school detection information. Further, the fish school detection processing unit 1030 can detect a school of fish in the sea based on the various information from the group of sensors 112 and generate fish school detection information. Furthermore, the fish school detection processing unit 1030 can generate fish school detection information by combining the imaging data of the imaging device 113 and the various information of the group of sensors 112. The details of the fish school detection process of the fish school detection processing unit 1030 are described later.

The fish school tracking processing unit 1040 executes a fish school tracking process. Specifically, it is possible to identify the direction of movement of the school of fish in the sea imaging data and generate fish school tracking information. Further, the fish school tracking processing unit 1040 can generate fish school tracking information based on the various information from the group of sensors 112. Furthermore, the fish school tracking processing unit 1040 can generate fish school tracking information by combining the sea imaging data of the imaging device 113 and the various information of the group of sensors 112. The details of the fish school tracking process of the fish school tracking processing unit 1040 are described later.

The hooking determination processing unit 1050 executes a hooking determination process of the fish 900. Specifically, it is possible to identify the positions of the fish 900 and the artificial bait 740 in the school of fish in the sea imaging data, and generate hook determination information. Further, the hooking determination processing unit 1050 can generate hooking determination information based on the various information from the group of sensors 112. Furthermore, the hooking determination processing unit 1050 can generate hooking determination information by combining the sea imaging data from the imaging device 113 and the various information from the group of sensors 112. The details of the hooking determination process of the hooking determination processing unit 1050 are described later.

The fish school detection learning unit 1060 can generate a fish school detection model by learning through machine learning such as a neural network or deep learning. The details of the learning by the fish school detection learning unit 1060 are described later.

The fish school tracking learning unit 1070 can generate a fish school tracking model by learning through machine learning such as a neural network or deep learning. The details of the learning by the fish school tracking learning unit 1070 are described later.

The hooking determination learning unit 1080 can generate a hooking determination model by learning through machine learning such as a neural network or deep learning. The details of the learning by the hooking determination learning unit 1080 are described later.

The storage unit 1090 can store the various information of the group of sensors 112, the sea imaging data of the imaging device 113, the fish school detection model, the fish school tracking model, and the hook determination model, and the like. For example, one or more memories or hard disk drives (HDD) can be used for the storage unit 1090.

[2. Connection Configuration between Unmanned Aerial Vehicle 100 and Fishing Line Fixing Unit 200]

A connection configuration between the unmanned aerial vehicle 100 and the fishing line fixing portion 200 in the fishing system 10 is described with reference to FIGS. 4A to 4D.

Each of FIGS. 4A to 4D is a schematic cross-sectional view illustrating the connection configuration between the unmanned aerial vehicle 100 and the fishing line fixing portion 200 of the fishing system 10 according to an embodiment of the present invention.

Figure 4A:
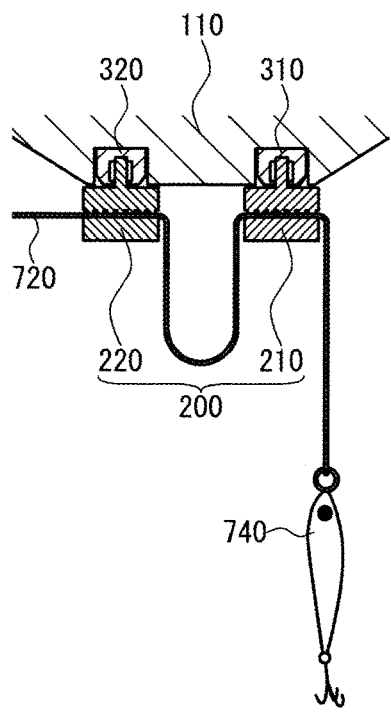
FIG. 4A is a schematic cross-sectional view illustrating a connection configuration between an unmanned aerial vehicle and a fishing line fixing portion of a fishing system according to an embodiment of the present invention.

FIG. 4A shows a state in which the fishing system 10 detects a school of fish while flying the unmanned aerial vehicle 100 (a step of detecting a school of fish). The fishing line fixing portion 200 is placed below the main body 110 of the unmanned aerial vehicle 100. The fishing line fixing portion 200 includes the first fixing portion 210 and the second fixing portion 220. The first fixing portion 210 and the second fixing portion 220 are connected to a first connecting portion 310 and a second connecting portion 320 provided below the main body 110, respectively. In other words, the first fixing portion 210 and the second fixing portion 220 are fixed to the main body 110 via the first connecting portion 310 and the second connecting portion 320, respectively. Each of the first fixing portion 210 and the second fixing portion 220 has a gap or a through hole through which the fishing line 720 is inserted. The fishing line 720 is inserted so that the artificial bait 740 attached to the first end of the fishing line 720 is closer to the first fixing portion 210 than to the second fixing portion 220. Further, each of the first fixing portion 210 and the second fixing portion 220 fixes the fishing line 720 inserted therethrough. Each of the first fixing portion 210 and the second fixing portion 220 can fix the fishing line 720, for example, by narrowing the inside of the gap or the through hole, or by gripping the fishing line 720 that is inserted.

The fishing line 720 is preferably fixed between the first fixing portion 210 and the second fixing portion 220 so as to have a certain length (or flex). When the length of the fishing line 720 between the first fixing portion 210 and the second fixing portion 220 is long enough, the artificial bait 740 can be dropped from a high altitude of the unmanned aerial vehicle 100. Although not shown in the figures, a rotor around which the fishing line 720 is reeled may be provided between the first connection portion 310 and the second connection portion 320 of the main body 110. When the artificial bait 740, which is described later, is dropped, the rotor rotates by being pulled by dropped fishing line 720, and the reeled fishing line 720 on the rotor can be dropped.

In the step of detecting a school of fish, the fish school detection process is mainly executed by the fishing system 10.

Figure 4B:
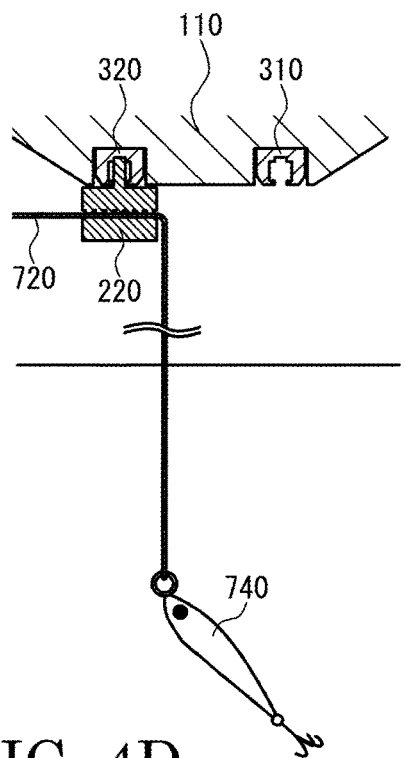
FIG. 4B is a schematic cross-sectional view illustrating a connection configuration between an unmanned aerial vehicle and a fishing line fixing portion of a fishing system according to an embodiment of the present invention.

FIG. 4B shows a state in which the fishing system 10 drops the artificial bait 740 (a step of dropping artificial bait). When the fishing system 10 detects a school of fish, the fish school detection information is generated. The connection control unit 1020 receives the fish school detection information, controls the first connection portion 310, and releases of the connection of the first fixing portion 210. As a result, the first fixing portion 210 is dropped into the sea, and the artificial bait 740 attached to the first end of the fishing line 720 fixed to the first fixing portion 210 is also dropped. As shown in FIG. 4B, since the second fixing portion 220 to which the fishing line 720 is fixed is fixed to the main body 110 via the second connecting portion 320, the artificial bait 740 in the sea can be moved with the flight of the unmanned aerial vehicle 100. Although not shown in figures, the dropped first fixing portion 210 is in a state in which the fishing line 720 is fixed. In other words, the first fixing portion 210 is attached to the fishing line 720. Therefore, when the user 800 reels the fishing line 720 onto the reel 730, the first fixing portion 210 can be recovered.

After the step of dropping the artificial bait, the fishing system 10 mainly executes the fish school tracking process as a step of tracking a school of fish.

Figure 4C:
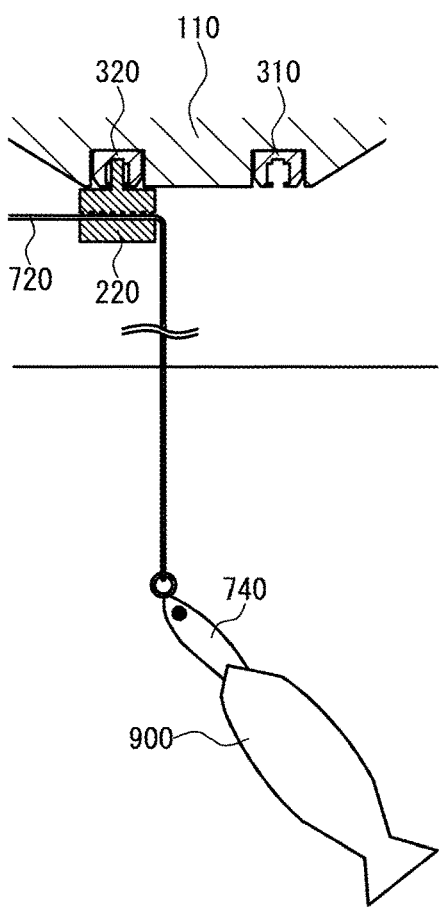
FIG. 4C is a schematic cross-sectional view illustrating a connection configuration between an unmanned aerial vehicle and a fishing line fixing portion of a fishing system according to an embodiment of the present invention.
Figure 4D:
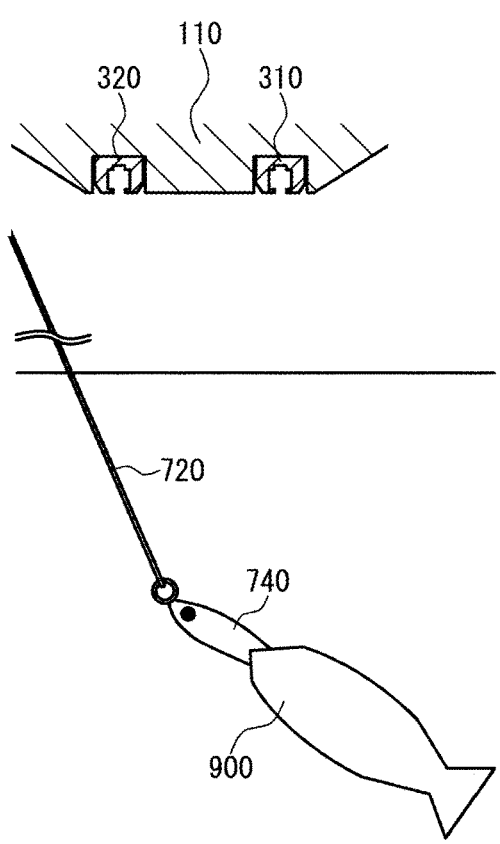
FIG. 4D is a schematic cross-sectional view illustrating a connection configuration between an unmanned aerial vehicle and a fishing line fixing portion of a fishing system according to an embodiment of the present invention.

FIG. 4C shows a state in which the fish 900 is hooked (a hooking determination step), and FIG. 4D shows a state in which the fishing line 720 is separated from the unmanned aerial vehicle 100 in the fishing system 10 (a step of separation between an unmanned aerial vehicle and a fishing line). In the fishing system 10, it is determined whether the fish 900 is hooked on the artificial bait 740, and the hooking determination information is generated. The connection control unit 1020 receives the hooking determination information, controls the second connection portion 320, and releases the connection of the second fixing portion 220. As a result, since the second fixing portion 220 is dropped into the sea, the unmanned aerial vehicle 100 is separated from the fishing line 720, and the unmanned aerial vehicle 100 can be prevented from being pulled into the sea. The unmanned aerial vehicle 100 that dropped the second fixing portion 220 may ascend and visually inform the user 800 that the second fixing portion 220 dropped. The user 800 can see the unmanned aerial vehicle 100 ascend and reel the fishing line 720 onto the reel 730. Although not shown in the figures, the dropped second fixing portion 220 is in a state in which the fishing line 720 is fixed. In other words, the second fixing portion 220 is attached to the fishing line 720. Therefore, when the user 800 reels the fishing line 720 onto the reel 730, the second fixing portion 220 can be recovered. Further, the unmanned aerial vehicle 100 flies to a predetermined position (for example, a takeoff position, etc.) by the control of the user 800 or by the autopilot, and is recovered.

In the fishing system 10, the second connection portion 320 can also disconnect the second fixing portion 220 when the second connection portion 320 is pulled with a force greater than or equal to a preset value. When the fish 900 is hooked on the artificial bait 740, the fish 900 moves while biting the artificial bait 740, thereby, the fishing line 720 is pulled toward the sea. In addition, along with the fishing line 720, the unmanned aerial vehicle 100 is also pulled toward the sea. That is, when the fish 900 is hooked, the unmanned aerial vehicle 100 moves in the direction of the sea. The fishing system 10 detects the movement towards the sea of the unmanned aerial vehicle 100 by means of the group of sensors 112 and generates a control signal. The connection control unit 1020 may receive this control signal, control the second connection portion 320, and release the connection of the second fixing portion 220. As a result, it is further possible to prevent the unmanned aerial vehicle 100 from being pulled into the sea. Also, the force setting may be determined based on the size or the payload of the unmanned aerial vehicle 100.

<Modification 1>

A configuration of a fishing line fixing portion 200a, which is a modified example of the fishing line fixing portion 200, is described with reference to FIGS. 5A to 5D.

Each of FIGS. 5A to 5D is a schematic cross-sectional view illustrating a connection configuration between the unmanned aerial vehicle 100 and the fishing line fixing portion 200a of the fishing system 10 according to an embodiment of the present invention. In the following description, when the fishing line fixing portion 200a includes the configuration similar to the fishing line fixing portion 200, the description of the configuration of the fishing line fixing portion 200a may be omitted.

Figure 5A:
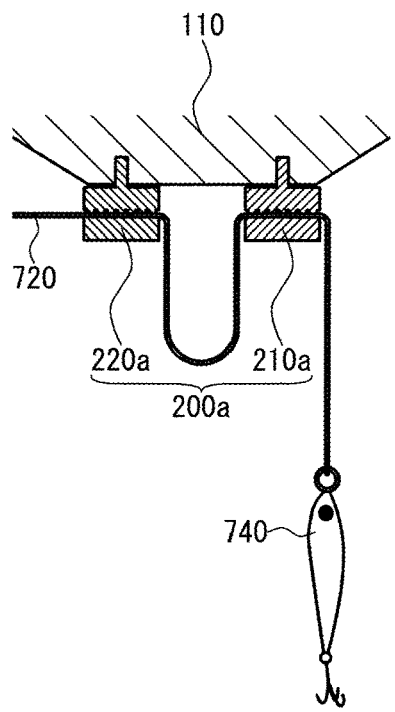
FIG. 5A is a schematic cross-sectional view illustrating a connection configuration between an unmanned aerial vehicle and a fishing line fixing portion of a fishing system according to an embodiment of the present invention.

FIG. 5A shows a state in which the fishing system 10 detects a school of fish while flying the unmanned aerial vehicle 100 (a step of detecting a school of fish). The fishing line fixing portion 200a is placed below the main body 110 of the unmanned aerial vehicle 100. The fishing line fixing portion 200a includes a first fixing portion 210a and a second fixing portion 220a. The first fixing portion 210a and the second fixing portion 220a are fixed to the main body 110. Each of the first fixing portion 210a and the second fixing portion 220b has a gap through which the fishing line 720 is inserted. Each of the first fixing portion 210a and the second fixing portion 220a fixes the inserted fishing line 720. Each of the first fixing portion 210a and the second fixing portion 220a can fix the fishing line 720, for example, by narrowing the inside of the gap or a through hole, or by gripping the fishing line 720 that is inserted.

Figure 5B:
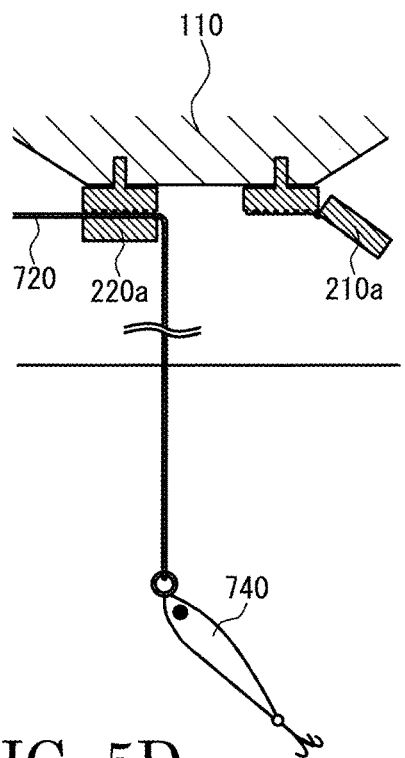
FIG. 5B is a schematic cross-sectional view illustrating a connection configuration between an unmanned aerial vehicle and a fishing line fixing portion of a fishing system according to an embodiment of the present invention.

FIG. 5B shows a state in which the fishing system 10 drops the artificial bait 740 (a step of dropping the artificial bait). When the fishing system 10 detects a school of fish, the fish school determination information is generated. The first fixing portion 210 receives the fish school determination information and releases the fixing of the fishing line 720. For example, the first fixing portion 210a is divided into two parts with the gap or the through hole as a boundary (however, even when divided into two parts, the two are still connected), and the first fixing portion 210a can release the fixing of the fishing line 720 inserted therethrough. As a result, the fishing line 720 and the artificial bait 740 are dropped into the sea. As shown in FIG. 5B, since the second fixing portion 220a to which the fishing line 720 is fixed is fixed to the main body 110, the artificial bait 740 can be moved in the sea as the unmanned aerial vehicle 100 flies. Also, the first fixing portion 210a is in a state of being fixed to the main body 110 without being dropped into the sea. Therefore, when the unmanned aerial vehicle 100 is recovered, the first fixing portion 210a can be recovered.

Figure 5C:
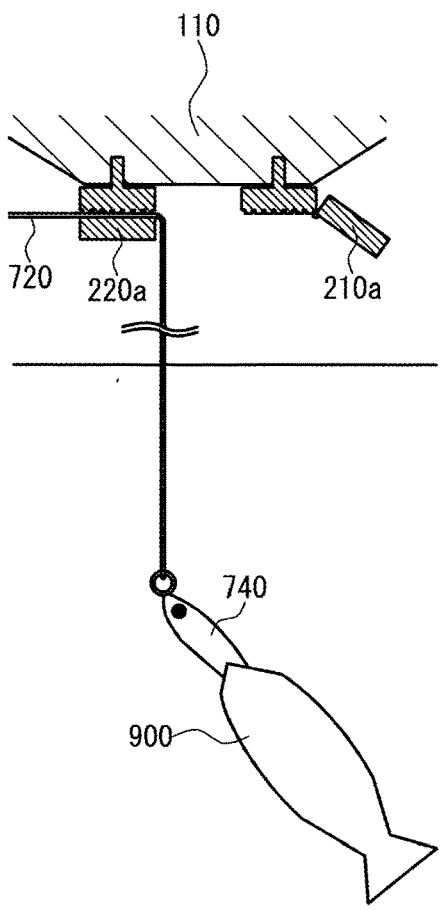
FIG. 5C is a schematic cross-sectional view illustrating a connection configuration between an unmanned aerial vehicle and a fishing line fixing portion of a fishing system according to an embodiment of the present invention.
Figure 5D:
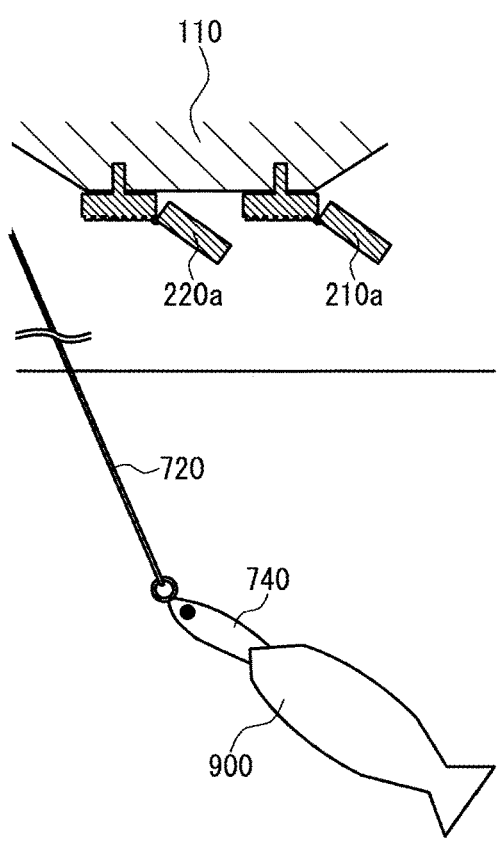
FIG. 5D is a schematic cross-sectional view illustrating a connection configuration between an unmanned aerial vehicle and a fishing line fixing portion of a fishing system according to an embodiment of the present invention.

FIG. 5C shows a state in which the fish 900 is hooked (a hooking determination step), and FIG. 5D shows a state in which the fishing line 720 is separated from the unmanned aerial vehicle 100 in the fishing system 10 (a step of separation between the unmanned aerial vehicle and the fishing line). In the fishing system 10, it is determined whether the fish 900 is hooked on the artificial bait 740, and the hooking determination information is generated. The second fixing portion 220a receives the hooking determination information and releases the fixing of the fishing line 720. The second fixing portion 220a is also divided into two parts by a gap or a through hole (however, even when divided into the two parts, the two parts are connected), and the second fixing portion 220a can release the fixing of the fishing line 720 inserted therethrough. As a result, since the fishing line 720 is separated from the unmanned aerial vehicle 100, it is possible to prevent the unmanned aerial vehicle 100 from being pulled into the sea. The second fixing portion 220a is also fixed to the main body 110 without being dropped into the sea. Therefore, when the unmanned aerial vehicle 100 is recovered, the second fixing portion 220a can be recovered.

In the fishing system 10 including the modified fishing line fixing portion 200a, the movement of the unmanned aerial vehicle 100 in the direction of the sea can also be detected by the group of sensors 112 and a control signal can be generated. The second fixing portion 220a may receive this control signal and release the fixing of the fishing line 720. As a result, it is further possible to prevent the unmanned aerial vehicle 100 from being pulled into the sea.

In addition, a configuration of the fishing line fixing portion 200 of the fishing system 10 is not limited to the configuration described above, including the first modification. The fishing line fixing portion 200 may release the fixing of the fishing line 720 by the first fixing portion to drop the artificial bait 740, and release the fixing of the fishing line 720 by the second fixing portion to separate the unmanned aerial vehicle 100 and the fishing line 720. Further, the first fixing portion and the second fixing portion may be integrated as long as the fixing of the fishing line 720 is released independently.

<Modification 2>

A configuration of a fishing line fixing portion 200b, which is a further modified example of the fishing line fixing portion 200, is described with reference to FIGS. 6A to 6D.

Each of FIGS. 6A to 6D is a schematic cross-sectional view illustrating a connection configuration between the unmanned aerial vehicle 100 and the fishing line fixing portion 200b of the fishing system 10 according to an embodiment of the present invention. In the following description, when the fishing line fixing portion 200b includes the configuration similar to the fishing line fixing portion 200 or the fishing line fixing portion 200a, the description of the configuration of the fishing line fixing portion 200b may be omitted.

Figure 6A:
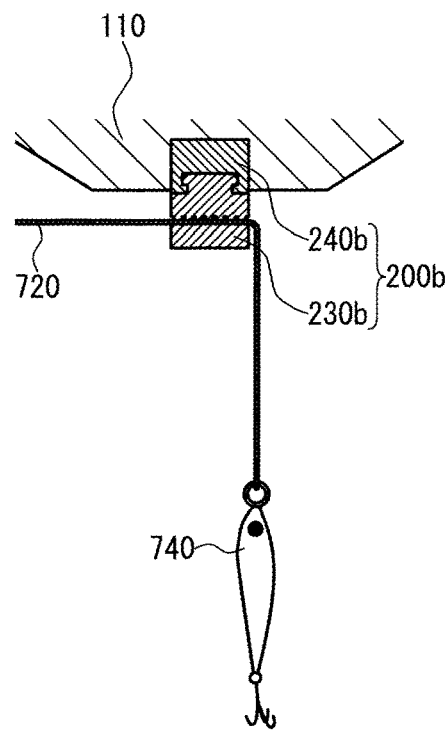
FIG. 6A is a schematic cross-sectional view illustrating a connection configuration between an unmanned aerial vehicle and a fishing line fixing portion of a fishing system according to an embodiment of the present invention.

FIG. 6A shows a state in which the fishing system 10 detects a school of fish while flying the unmanned aerial vehicle 100 (a step of detecting a school of fish). The fishing line fixing portion 200b is placed below the main body 110 of the unmanned aerial vehicle 100. The fishing line fixing portion 200b includes a first fixing portion 230b and a second fixing portion 240b. The first fixing portion 230b has a gap or a through hole through which the fishing line 720 is inserted. Further, the first fixing portion 230b fixes the inserted fishing line 720. On the other hand, the second fixing portion 240b is fixed to the main body 110 of the unmanned aerial vehicle 100.

The first fixing portion 230b is formed with a convex portion, and a claw is provided at the end of the convex portion. On the other hand, the second fixing portion 240b is formed with a concave portion, and a groove is provided inside the concave portion. Therefore, when the convex portion of the first fixing portion 230b is inserted into the concave portion of the second fixing portion 240b, the claw of the convex portion engages with the groove of the concave portion, thereby connecting the first fixing portion 230b and the second fixing portion 240b. Further, when a certain force is applied from the outside, the groove of the concave portion and the claw of the convex portion are disengaged, and the connection between the first fixing portion 230b and the second fixing portion 240b is released. That is, the first fixing portion 230b and the second fixing portion 240b are detachably connected.

In this modification, the first fixing portion 230b can fix the fishing line 720 and suspend the artificial bait 740 attached to the first end of the fishing line 720. Further, the first fixing portion 230b is connected to the second fixing portion 240b fixed to the unmanned aerial vehicle 100. Therefore, the unmanned aerial vehicle 100 can fly while suspending the artificial bait 740 and detect a school of fish.

In FIG. 6A, although the second fixing portion 240b is embedded and fixed inside the main body 110, the fixing of the second fixing portion 240b to the main body 110 is not limited to this configuration. For example, the second fixing portion 240b may be fixed by being suspended from the main body 110. In FIG. 6A, although the first fixing portion 230a and the second fixing portion 240b are so-called male and female members, respectively, the male and female members may be reversed.

Figure 6B:
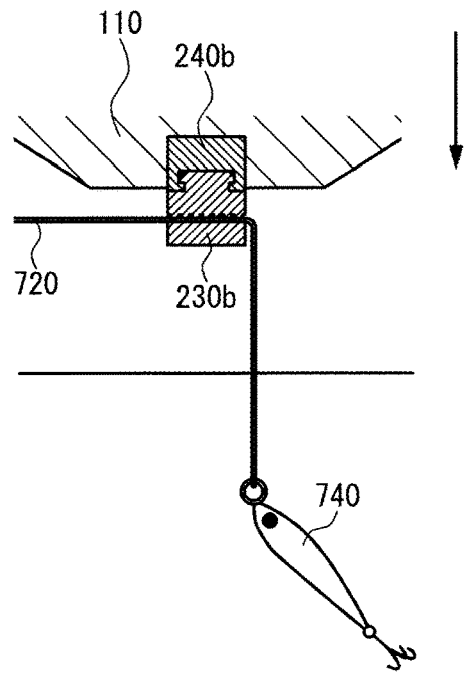
FIG. 6B is a schematic cross-sectional view illustrating a connection configuration between an unmanned aerial vehicle and a fishing line fixing portion of a fishing system according to an embodiment of the present invention.

FIG. 6B shows a state in which the fishing system 10 drops the artificial bait 740 (a step of dropping the artificial bait). When the fishing system 10 detects a school of fish, the unmanned aerial vehicle 100 descends to submerge the artificial bait 740 into the sea. Since the artificial bait 740 in the sea and the artificial bait 740 over the sea reflect different light, it is possible to identify the artificial bait 740 in the sea imaging data of the imaging device 113 to determine whether the artificial bait 740 is in the sea, for example.

Figure 6C:
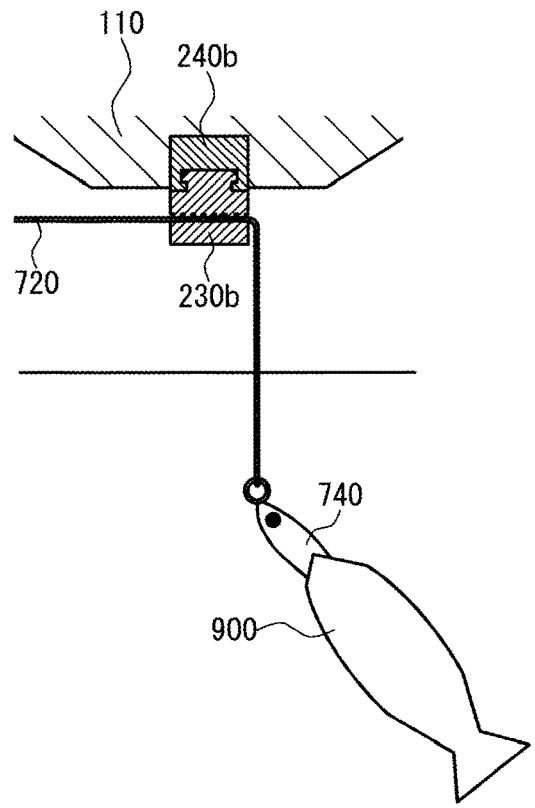
FIG. 6C is a schematic cross-sectional view illustrating a connection configuration between an unmanned aerial vehicle and a fishing line fixing portion of a fishing system according to an embodiment of the present invention.
Figure 6D:
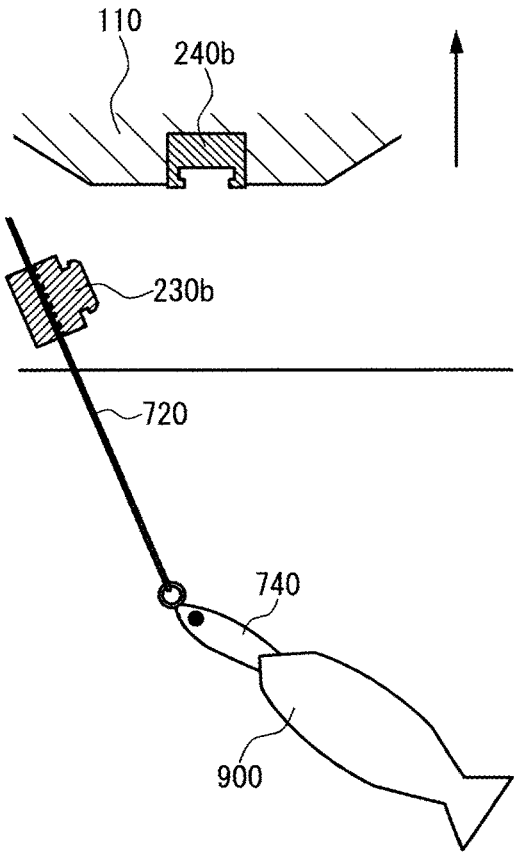
FIG. 6D is a schematic cross-sectional view illustrating a connection configuration between an unmanned aerial vehicle and a fishing line fixing portion of a fishing system according to an embodiment of the present invention.

FIG. 6C shows a state in which the fish 900 is hooked, and FIG. 6D shows a state in which the fishing line 720 is separated from the unmanned aerial vehicle 100 in the fishing system 10 (a step of separation between the unmanned aerial vehicle and the fishing line). When the fish 900 is hooked on the artificial bait 740, the fish 900 moves while biting the artificial bait 740, thereby, the fishing line 720 is pulled toward the sea. Further, the unmanned aerial vehicle 100 is also pulled toward the sea along with the fishing line 720. That is, when the fish 900 is hooked, the unmanned aerial vehicle 100 moves in the direction of the sea. The fishing system 10 detects the movement of the unmanned aerial vehicle 100 toward the sea using the group of sensors 112, and controls the unmanned aerial vehicle 100 so that the unmanned aerial vehicle 100 ascends. As a result, the first fixing portion 230b and the second fixing portion 240b are pulled in opposite directions, and when pulled with a certain force, the connection between the first fixing portion 230b and the second fixing portion 240b is released.

In this modification, the force of pulling the fishing line is transmitted to the fishing line fixing portion 200b, and the force can be used to release the connection between the first fixing portion 730b and the second fixing portion 740b. Therefore, it is possible to prevent the unmanned aerial vehicle 100 from being pulled into the sea. Also, although the hooking determination process of the fishing system 10 is not necessarily required, the hooking determination process may be executed in this modification. By executing the hooking determination process, it is possible to speed up the response of the control for ascent of the unmanned aerial vehicle 100 and further prevent the unmanned aerial vehicle 100 from being pulled into the sea.

[3. Fish School Detection Process and Generation of Fish School Detection Model]

The fish school detection process of the fishing system 10 and the generation of the fish school detection model are described with reference to FIG. 7.

Figure 7:
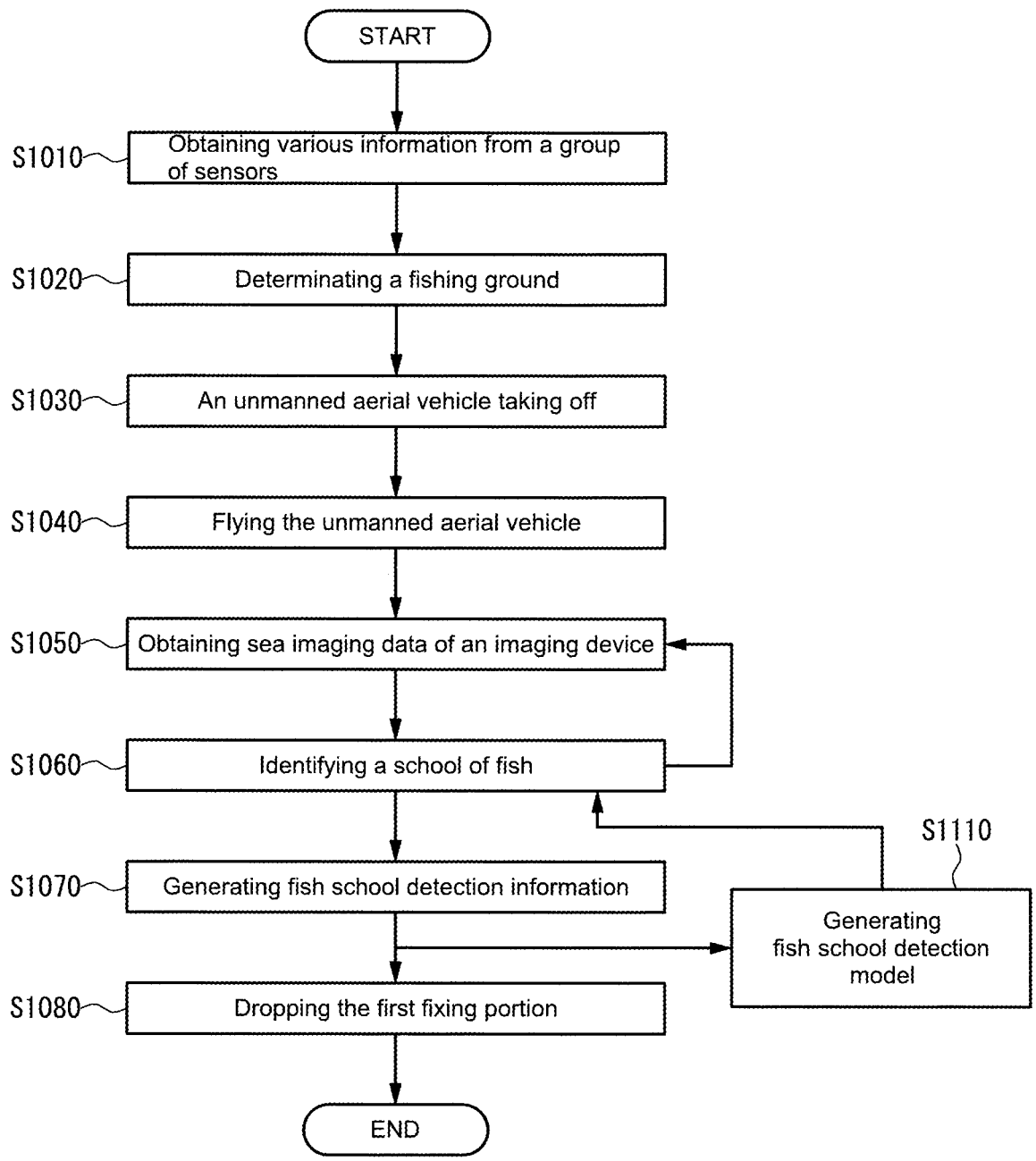
FIG. 7 is a flowchart illustrating a fish school detection process and generation of a fish school detection model of a fishing system according to an embodiment of the present invention.

FIG. 7 is a flowchart illustrating the fish school detection process and the generation of the fish school detection model of the fishing system 10 according to an embodiment of the present invention.

The fish school detection process of the fishing system 10 is executed when the user 800 starts fishing. The fish school detection process of the fishing system 10 includes a step of obtaining various information from the group of sensors 112 (S1010), a step of determining a fishing ground (S1020), a step of the unmanned aerial vehicle taking off 100 (S1030), a step of flying the unmanned aerial vehicle 100 (S1040), a step of obtaining the sea imaging data of the imaging device 113 (S1050), a step of identifying a school of fish (S1060), a step of generating fish school detection information (S1070), and a step of dropping the first fixing portion 210 (S1080).

In the step S1010, the fish school detection processing unit 1030 obtains various information from the group of sensors 112 of the unmanned aerial vehicle 100 at the departure position before the unmanned aerial vehicle 100 takes off. For example, the fish school detection processing unit 1030 obtains temperature information, humidity information, barometric pressure information, or position information (hereinafter, the position information obtained in the step is referred to as "departure position information") from the group of sensors 112. The temperature information, the humidity information, and the barometric pressure information are used in generating the fish school detection information in the step S1080. Further, the departure position information is used when the unmanned aerial vehicle 100 returns in step S3050.

In the step S1020, the fish school detection processing unit 1030 determines a fishing ground, which is a target position of the unmanned aerial vehicle 100. The fishing ground may be determined by the user 800 selecting from pre-registered fishing grounds, or may be determined by applying the fish school detection model based on the temperature information, the humidity information, and the atmospheric pressure information.

In the step S1030, the fish school detection processing unit 1030 transmits a takeoff signal to the flight control unit 1010. The flight control unit 1010 rotates the blades 140 so that the unmanned aerial vehicle 100 ascends based on the takeoff signal.

In the step S1040, the fish school detection processing unit 1030 transmits the target position signal to the flight control unit 1010. The flight control unit 1010 flies the unmanned aerial vehicle 100 toward the target position based on the target position information included in the target position signal.

In the step S1050, the fish school detection processing unit 1030 obtains the sea imaging data captured by the imaging device 113 at or near the target position.

In the step S1060, the fish school detection processing unit 1030 applies the fish school detection model to the captured sea imaging data to identify a school of fish in the sea imaging data. For example, the fish school detection processing unit 1030 can recognize a fish using the size, the shape, or the color (including the shadow) of an object in the sea imaging data as feature amounts, and can identify a school of fish. Further, the fish school detection processing unit 1030 may recognize a moving object as a fish and identify a school of fish from the difference in the sea imaging data between frames.

In the fish school detection process of the fishing system 10, the step S1050 and the step S1060 are repeated until a school of fish is identified in the step S1060. At this time, the unmanned aerial vehicle 100 may hover at the target position or fly near the target position. Once the school of fish is identified in the step S1060, the step S1070 is executed.

In the step S1070, the fish school detection processing unit 1030 generates the fish school detection information. The fish school detection information is generated by associating the position information of the position where the school of fish is identified, and the imaging sea data, the temperature information, the humidity information, and the barometric pressure information, and the like obtained in the step S1010.

In the step S1080, the fish school detection processing unit 1030 transmits the fish school detection information to the connection control unit 1020. The connection control unit 1020 that receives the fish school detection information releases the fixing of the first fixing portion 210. As a result, the artificial bait 740 is dropped into the sea together with the first fixing portion 210. Also, the fish school detection processing unit 1030 may transmit a part of the fish school detection information to the connection control unit 1020 as the first drop signal.

When the first fixing portion 210 is dropped, the fish school detection process of the fishing system 10 ends. Also, when the first fixing portion 210 is not dropped (for example, when it is not possible to identify that the artificial bait 740 is dropped into the sea by the imaging data of the imaging device 113), the fish school detection processing unit 1030 may transmit an abnormal signal to the flight control unit 1010 in order to return the unmanned aerial vehicle 100 to the departure position.

As described above, in the fish school detection process of the fishing system 10, the fish school detection model is applied to the sea imaging data to identify a school of fish in the sea imaging data. The fish school detection learning unit 1060 can use the generated fish school detection information as teacher data, for example, to repeatedly execute deep learning to generate the fish school detection model having a learned neuron network (S1110).

In addition, the unmanned aerial vehicle 100 may be operated by the user 800. Further, the user 800 may confirm the image based on the sea imaging data transmitted from the unmanned aerial vehicle 100 and identify the school of fish in the sea imaging data. In this case, the fixing of the first fixing portion 210 may be released by remote control by the user 800.

[4. Fish School Tracking Process and Generation of Fish School Tracking Model]

The fish school tracking process of the fishing system 10 and the generation of the fish school tracking model are described with reference to FIGS. 8 and 9A to 9D.

Figure 8:
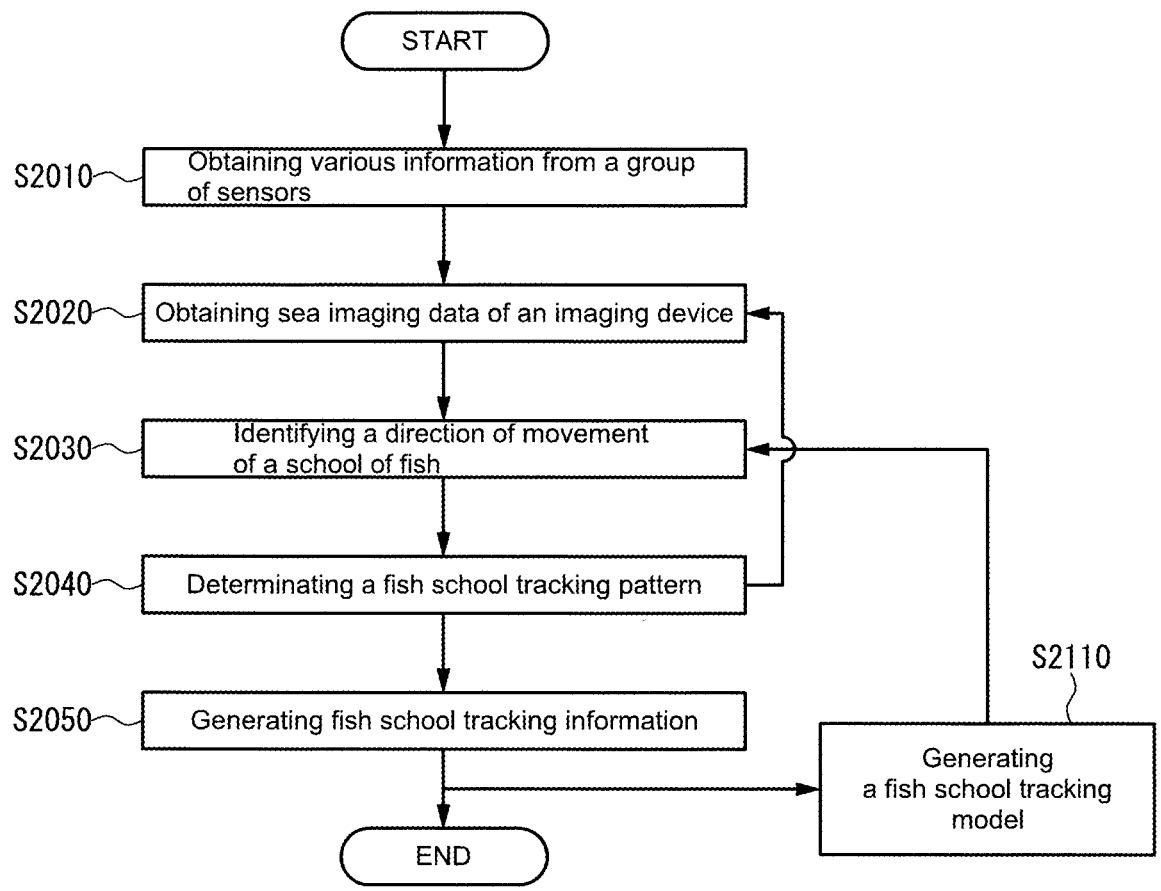
FIG. 8 is a flowchart illustrating a fish school tracking process and generation of a fish school tracking model of a fishing system according to an embodiment of the present invention.

FIG. 8 is a flow chart illustrating the process of tracking the fish school and the generation of the fish school tracking model of the fishing system 10 according to an embodiment of the present invention.

The fish school tracking process of the fishing system 10 is executed after the first fixing portion 210 is dropped. The fish school tracking process of the fishing system 10 includes a step of obtaining various information from the group of sensors 112 (S2010), a step of obtaining sea imaging data from the imaging device 113 (S2020), a step of identifying the direction of movement of the school of fish (S2030), a step of determining a fish school tracking pattern (S2040), and a step of generating fish school tracking information (S2050).

In the step S2010, the fish school tracking processing unit 1040 obtains the various information from the group of sensors 112 of the unmanned aerial vehicle 100. For example, the fish school tracking processing unit 1040 obtains the position information, the water temperature information, or the fish school information from the group of sensors 112.

In the step S2020, the fish school tracking processing unit 1040 obtains the sea imaging data captured by the imaging device 113.

In the step S2030, the fish school tracking processing unit 1040 applies the fish school tracking model to the captured sea imaging data to identify the fish school or the direction of the movement of the school of fish in the sea imaging data. For example, the fish school tracking processing unit 1040 can recognize a fish using the size, the shape, the color (including the shadow) of the object in the sea imaging data as feature amounts, and identify the school of fish. Further, the fish school tracking processing unit 1040 can calculate the direction of the moving object from the difference in the sea image data between frames, and can identify the direction of the movement of the school of fish.

In the step S2040, the fish school tracking processing unit 1040 determines a fish school tracking pattern. The fish school tracking pattern may be determined by the user 800 selecting from pre-registered fish school tracking patterns, and the fish school tracking model is applied based on the position information, the water temperature information, the fish school information, and the sea imaging data, or the like. When the fish school tracking model is applied, an appropriate fish school tracking pattern learned from the position information, the water temperature information, the fish school information, and the sea imaging data, or the like is determined.

Here, the fish school tracking patterns are described with reference to FIGS. 9A to 9D.

FIGS. 9A to 9D is a schematic diagram illustrating fish school tracking patterns executed in the fish school tracking process of the fishing system 10 according to an embodiment of the present invention.

Figure 9A:
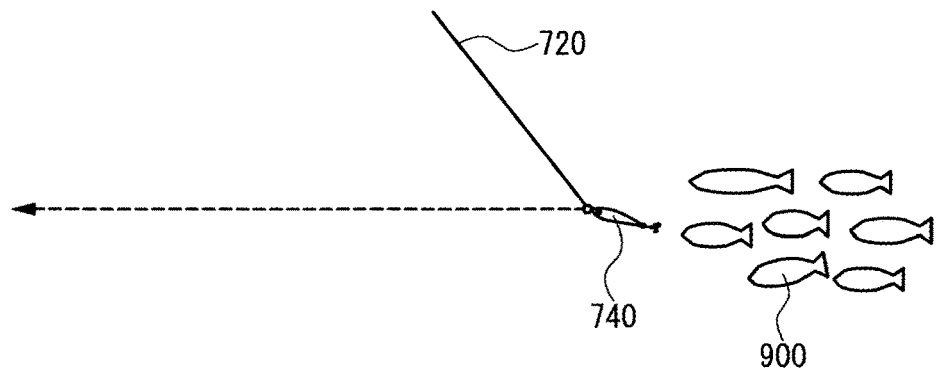
FIG. 9A is a schematic diagram illustrating fish school tracking patterns executed in a fish school tracking process of a fishing system according to an embodiment of the present invention.
Figure 9B:
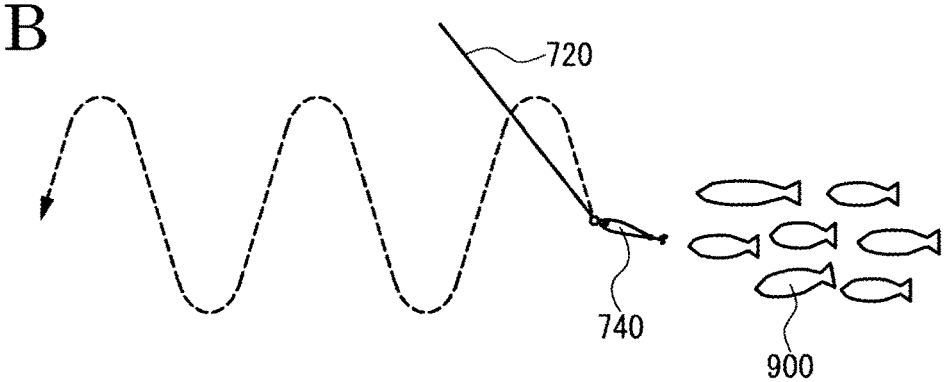
FIG. 9B is a schematic diagram illustrating fish school tracking patterns executed in a fish school tracking process of a fishing system according to an embodiment of the present invention.
Figure 9C:
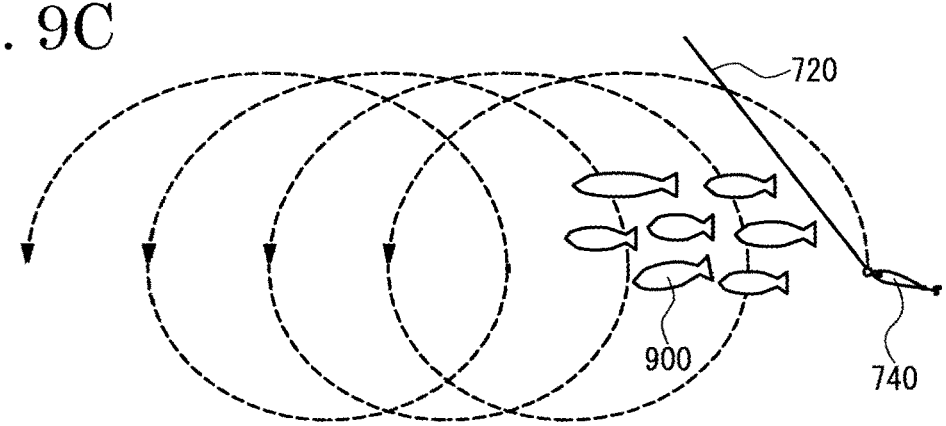
FIG. 9C is a schematic diagram illustrating fish school tracking patterns executed in a fish school tracking process of a fishing system according to an embodiment of the present invention.
Figure 9D:
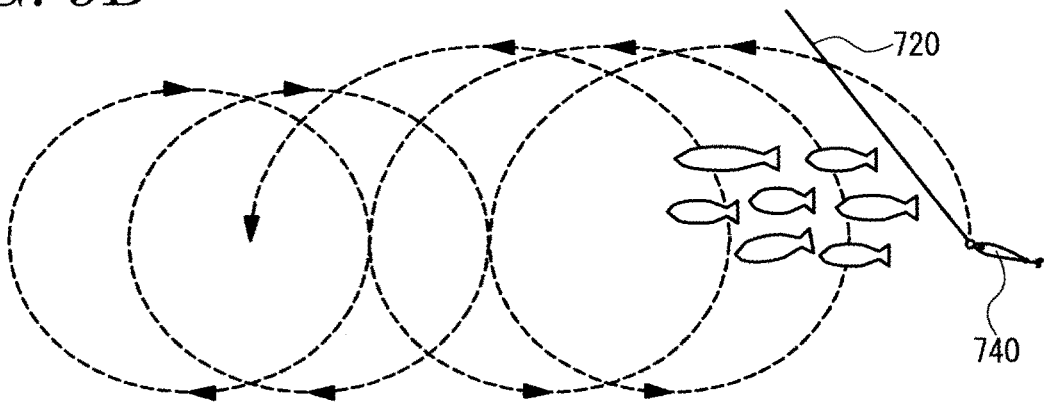
FIG. 9D is a schematic diagram illustrating fish school tracking patterns executed in a fish school tracking process of a fishing system according to an embodiment of the present invention.

In the fishing system 10, since the unmanned aerial vehicle 100 moves the artificial bait 740 in the vicinity of the artificial bait 740, the artificial bait 740 can be moved in complex ways. FIG. 9A shows a fish school tracking pattern in which the artificial bait 740 is moved linearly along the direction of movement of the school of fish including fish 900. FIG. 9B shows a fish school tracking pattern in which the artificial bait 740 is moved in a wave shape along the direction of movement of the school of fish including the fish 900. FIG. 9C is a fish school tracking pattern in which the artificial bait 740 is moved circularly so as to surround the school of fish in the direction of the movement of the school of fish including the fish 900. FIG. 9D is a fish school tracking pattern in which the artificial bait 740 is moved in a figure-of-eight shape so as to surround the school of fish in the direction of the movement of the school of fish including the fish 900. The fish school tracking patterns are not limited to the patterns shown in FIGS. 9A to 9D. The fish school tracking pattern may be a combination of the patterns shown in FIGS. 9A to 9D.

In the fish school tracking process of the fishing system 10, the steps S2020 to S2040 are repeated until the hooking determination information is generated by the hooking determination process, which is described later. At this time, the unmanned aerial vehicle 100 flies according to the fish school tracking pattern. When the hooking determination information is generated, the step S2050 is executed.

In the step S2050, the fish school tracking processing unit 1040 generates the fish school tracking information. The fish school tracking information is generated by associating the position information, the water temperature information, and the fish school information obtained in the step S2010, and the fish school tracking pattern and the sea imaging data in the process of tracking the fish school.

When the fish school tracking information is generated, the fish school process of the fishing system 10 ends.

As described above, in the fish school tracking process of the fishing system 10, the fish school tracking model is applied to the sea imaging data to identify the direction of the movement of the school of fish in the sea imaging data. The fish school tracking learning unit 1070 can use the generated fish school tracking information as teacher data, for example, to repeatedly execute deep learning in order to generate the fish school tracking model having a learned neuron network (S2110).

[5, Hooking Determination Process and Generation of Hooking Determination Model]

The hooking determination process of the fishing system 10 and the generation of the hooking determination model are described with reference to FIG. 10.

Figure 10:
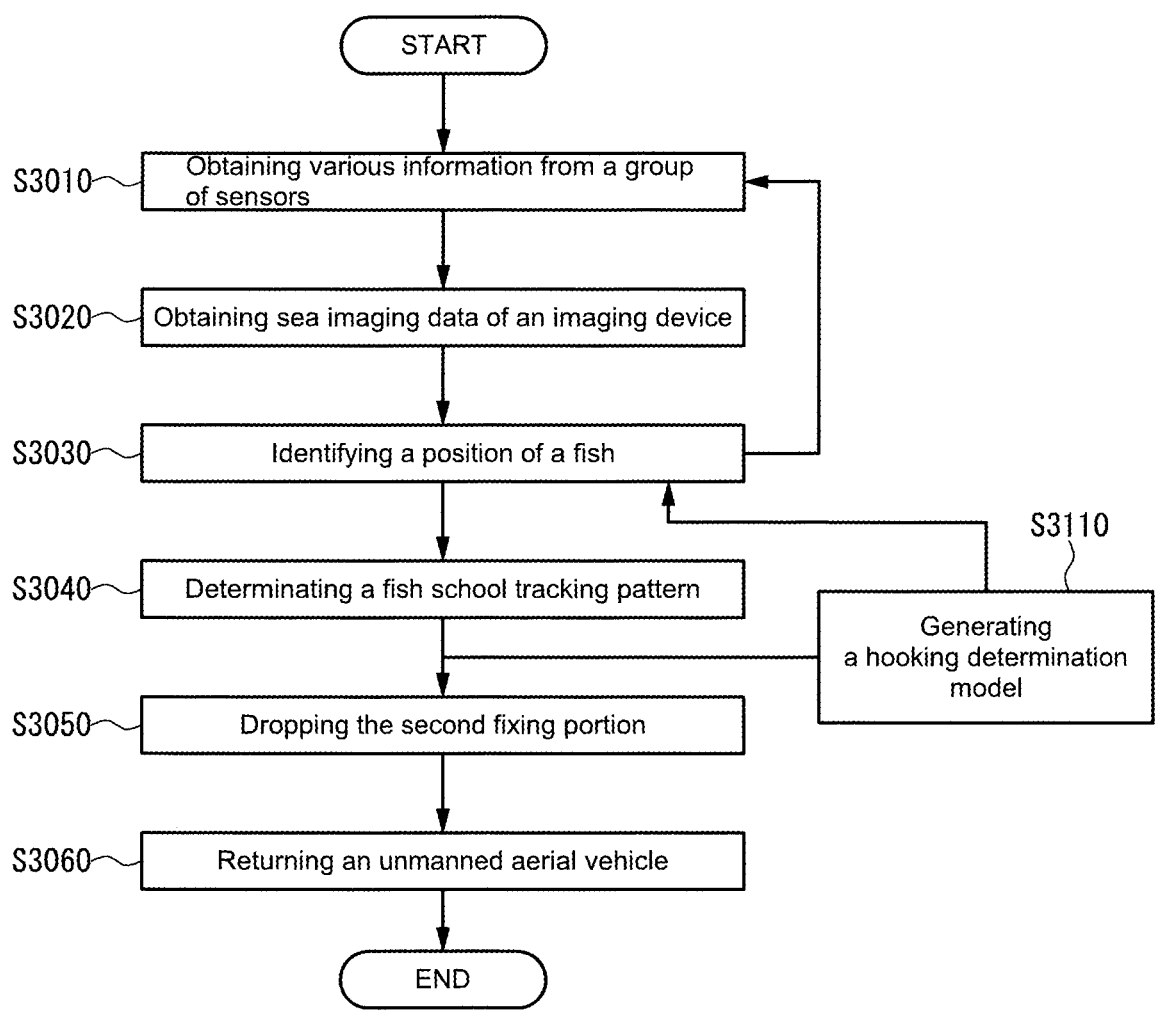
FIG. 10 is a flowchart illustrating a hooking determination process and generation of a hooking determination model of a fishing system according to an embodiment of the present invention.

FIG. 10 is a flowchart illustrating the hooking determination process and the generation of the hooking determination model of the fishing system 10 according to an embodiment of the present invention.

The hooking determination process of the fishing system 10 is executed in parallel with the fish school detection process in the above description. The hooking determination process of the fishing system 10 includes a step of obtaining various information from the group of sensors 112 (S3010), a step of obtaining sea imaging data from the imaging device 113 (S3020), a step of identifying the position of the fish 900 (S3030), a step of identifying the location of the fish 900 (S3040), a step of dropping the second fixing portion 220 (S3050), and a step of returning the unmanned aerial vehicle 100 (S3060).

In the step S3010, the hooking determination processing unit 1050 obtains the various information from the group of sensors 112 of the unmanned aerial vehicle 100. For example, the hooking determination processing unit 1050 obtains speed variation information, angular velocity variation information, or the like from the group of sensors 112.

In the step S3020, the hooking determination processing unit 1050 obtains the sea imaging data captured by the imaging device 113.

In the step S3030, the hooking determination processing unit 1050 applies the hooking determination model to the captured sea imaging data to identify the positions of the artificial bait 740 and the fish 900 in the captured sea data. For example, the hook determination processing unit 1050 recognizes the artificial bait 740 or the fish 900 by using the size, the shape, the color (including the shadow) of the object in the sea imaging data as feature quantities, and can identify the positions of the artificial bait 740 and the fish 900.

In the hooking determination process of the fishing system 10, the steps S3010 to S3030 are repeated until the position of the artificial bait 740 and the position of the fish 900 overlap each other in the step S3030. When the position of the artificial bait 740 and the position of the fish 900 overlap each other, it may be determined whether the fish 900 is hooked, and the step S3040 may be executed. However, for example, the hooking determination processing unit 1050 preferably determines whether the fish 900 is hooked when it is being pulled in the direction of the sea based on the speed variation information or the angular velocity variation information.

In the step S3040, the hooking determination processing unit 1050 generates the hooking determination information. The hooking determination information is generated by associating the sea imaging data when the fish 900 is hooked, the positions of the fish 900 and the artificial bait 740, and the like.

In the step S3050, the hooking determination processing unit 1050 transmits the hooking determination information to the connection control unit 1020. The connection control unit 1020 that receives the hooking determination releases the fixing of the second fixing unit 220. As a result, the second fixing portion 220 is dropped into the sea. Also, the hooking determination processing unit 1050 may transmit a part of the hooking determination information to the connection control unit 1020 as the second drop signal. Further, when the hooking determination processing unit 1050 detects that the unmanned aerial vehicle 100 is pulled in the direction of the sea, a control signal may be transmitted to the flight control unit 1010 so that the unmanned aerial vehicle 100 ascends or flies in the direction opposite to the pulling direction.

In the step S3060, the hooking determination processing unit 1050 transmits a returning signal to the flight control unit 1010. The flight control unit 1010 controls so that the unmanned aerial vehicle 100 flies toward the departure position based on the departure position information included in the returning signal.

When the unmanned aerial vehicle 100 returns to the departure position, the hook determination process of the fishing system 10 ends.

As described above, in the hooking determination process of the fishing system 10, the hooking determination model is applied to the sea imaging data to identify the positions of the fish 900 and the artificial bait 740 in the sea imaging data. The hooking determination learning unit 1080 uses the generated hooking determination information as teacher data, for example, to repeatedly execute deep learning to generate the hooking determination model having a learned neuron network (S3110).

As described above, in the fishing system 10 according to an embodiment of the present invention, even after the artificial bait 740 is dropped into the sea by releasing the fixing of the first fixing portion 210, the second fixing portion 220 is fixed to the unmanned aerial vehicle 100 so that the flight of the unmanned aerial vehicle 100 can be controlled to track the school of fish. Further, since not only the group of sensors 112 but also the hook determination processing unit 1050 determines whether the fish is hooked, it is possible to quickly release the second fixing portion 220 and separate the fishing line 720 from the unmanned aerial vehicle 100. As a result, it is possible to prevent the unmanned aerial vehicle 100 from being pulled into the sea when the fish is hooked.

Second Embodiment

A fishing system 10A according to an embodiment of the present invention is described with reference to FIGS. 11 and 12. In the following description, when the fishing system 10A includes the configuration similar to the fishing system 10, the description of the configuration of the fishing system 10A may be omitted.

Figure 11:
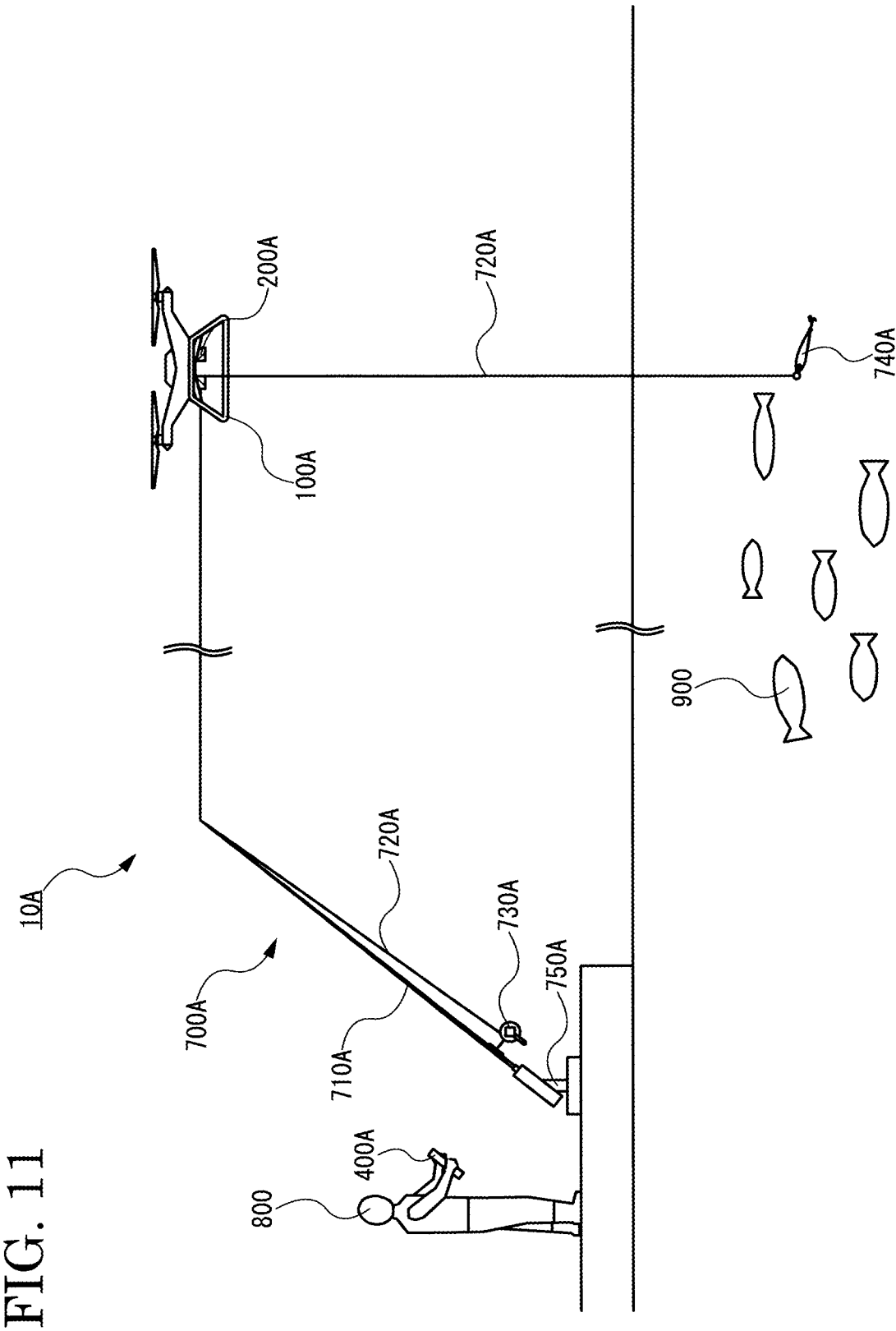
FIG. 11 is a schematic diagram illustrating the use of a fishing system according to an embodiment of the present invention.

FIG. 11 is a schematic diagram illustrating the use of the fishing system 10A according to an embodiment of the present invention. The fishing system 10A includes an unmanned aerial vehicle 100A, a fishing line fixing portion 200A, and an information communication terminal 400A. Each of the unmanned aerial vehicle 100A and the information communication terminal 400A is equipped with a communication unit, and the unmanned aerial vehicle 100A and the information communication terminal 400A can be communicatively connected to each other via wireless communication.

A fishing tackle 700A used in the fishing system 10A includes a fishing rod 710A, a fishing line 720A, a reel 730A, an artificial bait 740A, and a fishing rod support 750A. The fishing rod support 750A can support the fishing rod 710A. Therefore, when the fishing rod 710A is placed on the fishing rod support 750A, the user 800 does not need to hold the fishing rod 710A. A motor and a communication unit are mounted on the reel 730A. The communication unit of the reel 730A can communicate with the unmanned aerial vehicle 100A via wireless communication, and can automatically reel the fishing line 720A according to an instruction from the unmanned aerial vehicle 100A. Therefore, in the fishing system 10A, the user 800 can catch the fish 900 by simply causing the unmanned aerial vehicle 100A to take off without touching the fishing rod 710 or the reel 730 at all.

FIG. 12 is a schematic diagram illustrating a screen of the information communication terminal of the fishing system 10A according to an embodiment of the present invention.

In the fishing system 10A, the user 800 can confirm the detection and tracking of the school of fish on the screen of the information communication terminal 400A. Further, the screen of the information communication terminal 400A is a so-called touch panel. On the screen of the information communication terminal 400A shown in FIG. 12, an image 410 based on the sea imaging data, an image 420 based on the sonar information, and an image 430 based on the position information are displayed. An icon 440A for the controller of the unmanned aerial vehicle 100 and an icon for dropping the fishing line fixing portion 200A are also displayed. Therefore, the user 800 can input an instruction by touching the icon while confirming the detection or tracking of the fish school on the screen of the information communication terminal 400A, and the user instruction signal can be transmitted to the unmanned aerial vehicle 100A. Therefore, the user 800 can intervene and make fine adjustments in the fish school detection process, the fish school tracking process, or the hooking determination process.

Also, the images and icons displayed on the screen of information communication terminal 400A are not limited to the configuration shown in FIG. 12. The information communication terminal 400A can display images of all kinds of information related to the detection and tracking of the school fish. Further, the information communication terminal 400A can display icons for instructions on all kinds of controls or processes related to the fish school detection process, the fish school tracking process, and the hook determination process. In addition, the position of the image or the position of the icon displayed on the information communication terminal 400A may be freely changed by the user 800.

As described above, in the fishing system 10A according to an embodiment of the present invention, the fish 900 can be caught using the information communication terminal 400A. Further, since the unmanned aerial vehicle 100A is provided with the fishing line fixing portion 200A, it is possible to prevent the unmanned aerial vehicle 100 from being pulled into the sea when the fish is hooked.

An embodiment of the present invention can be appropriately combined with components and implemented as long as they do not contradict each other. In addition, deletion, or design changes of constituent elements, or additions, omissions, or changes to conditions of steps as appropriate based on the embodiment of the present invention are also included within the scope of the present invention as long as the gist of the present invention is provided.

Other effects which differ from those brought about by the embodiment of the present invention, but which are apparent from the description herein or which can be readily predicted by those skilled in the art, are naturally understood to be brought about by the present invention.

What is claimed is:
1. A fishing system comprising:
an unmanned aerial vehicle; and
a fishing line fixing portion detachably fixed to a main body of the unmanned aerial vehicle and fixing a fishing line,
wherein the unmanned aerial vehicle comprising:
an imaging device,
a connection control unit configured to release a fixing between the main body and the fishing line fixing portion,
a fish school tracking processing unit configured to identify a fish in imaging data captured by the imaging device and control the unmanned aerial vehicle to track the fish, and
a hooking determination processing unit configured to determine whether the fish is hooked on an artificial bait attached to a first end of the fishing line.
2. The fishing system according to claim 1,
wherein the fishing line fixing portion comprises a first fixing portion and a second fixing portion, and
a fixing between the main body and the first fixing portion and a fixing between the main body and the second fixing portion are independently released.

3. The fishing system according to claim 2,
wherein the artificial bait is dropped into the sea together with the first fixing portion when the fixing between the main body and the first fixing portion is released.

4. The fishing system according to claim 3,
wherein the fixing between the main body and the second fixing portion is released and the second fixing portion is dropped into the sea when the fish is hooked.

5. A fishing system comprising:
an unmanned aerial vehicle; and
a fishing line fixing portion fixed to a main body of the unmanned aerial vehicle and fixing a fishing line,
wherein the unmanned aerial vehicle comprising:
  an imaging device,
    a connection control unit configured to release a fixing of the fishing line by the fishing line fixing portion,
    a fish school tracking processing unit configured to identify a fish in imaging data captured by the imaging device and control the unmanned aerial vehicle to track the fish, and
    a hooking determination processing unit configured to determine whether the fish is hooked on an artificial bait attached to a first end of the fishing line,
  the fishing line fixing portion comprises a first fixing portion and a second fixing portion,
  a fixing of the fishing line by the first fixing portion and a fixing of the fishing line by the second fixing portion are independently released,
  the artificial bait is dropped into the sea when the fixing of the fishing line by the first fixing portion is released, and
  the fixing of the fishing line by the second fixing portion is released when the fish is hooked.

6. The fishing system according to claim 1,
wherein the hooking determination processing unit makes determinations based on an information from a group of sensors provided on the unmanned aerial vehicle.

7. The fishing system according to claim 1,
wherein the hooking determination processing unit makes determinations by identifying a position of the fish in imaging data captured by the imaging device.

8. The fishing system according to claim 5,
wherein the hooking determination processing unit makes determinations based on an information from a group of sensors provided on the unmanned aerial vehicle.

9. The fishing system according to claim 5,
wherein the hooking determination processing unit makes determinations by identifying a position of the fish in imaging data captured by the imaging device.

* * * * *